United States Patent
Achmueller et al.

(10) Patent No.: US 10,702,772 B2
(45) Date of Patent: Jul. 7, 2020

(54) ELECTRONIC GAMING MACHINE AND METHOD PROVIDING ENHANCED PHYSICAL PLAYER INTERACTION

(71) Applicant: IGT, Las Vegas, NV (US)

(72) Inventors: Klaus Achmueller, Kalsdorf b. Graz (AT); Stefan Keilwert, St. Josef (AT); Thomas Waxman, Reno, NV (US)

(73) Assignee: IGT, Las Vegas, NV (US)

( * ) Notice: Subject to any disclaimer, the term of this patent is extended or adjusted under 35 U.S.C. 154(b) by 116 days.

(21) Appl. No.: 15/707,639

(22) Filed: Sep. 18, 2017

(65) Prior Publication Data
US 2018/0078854 A1  Mar. 22, 2018

Related U.S. Application Data

(60) Provisional application No. 62/398,272, filed on Sep. 22, 2016.

(51) Int. Cl.
*A63F 13/285* (2014.01)
*H04N 13/279* (2018.01)
(Continued)

(52) U.S. Cl.
CPC .......... *A63F 13/285* (2014.09); *A63F 13/20* (2014.09); *G06F 3/012* (2013.01); *G06F 3/013* (2013.01);
(Continued)

(58) Field of Classification Search
CPC .......... G07F 17/3211; G07F 17/3209; G07F 17/218; G07F 17/3206; A63F 13/50;
(Continued)

(56) References Cited

U.S. PATENT DOCUMENTS

| 7,371,163 B1 | 5/2008 | Best |
| 8,460,103 B2 | 6/2013 | Mattice et al. |

(Continued)

FOREIGN PATENT DOCUMENTS

WO    WO2016095016    6/2016

OTHER PUBLICATIONS

Casino Journal, The Simpsons video slot machine—Scientific Games, shown at Global Gaming Expo ("G2E") Oct. 8, 2015 (2 pages).
(Continued)

*Primary Examiner* — Jasson H Yoo
(74) *Attorney, Agent, or Firm* — Neal, Gerber & Eisenberg LLP

(57) ABSTRACT

The electronic gaming machine (EGM) and methods of the present disclosure improve gaming technology and provide enhanced physical player interaction. In various embodiments, the EGM includes a display device configured to display 3D images to a player without requiring the player to wear 3D glasses, a player eye or head tracker configured to track movement of either the eyes or the head of the player, a player hand position locator configured to determine one or more positions of at least one of the player's hands in front of the display device, and a player tactile feedback provider configured to provide tactile feedback to at least one of the player's hands to provide enhanced physical player interaction in association with one or more plays of a primary or bonus game or other EGM functionality.

17 Claims, 16 Drawing Sheets

(51) Int. Cl.
*H04N 13/366* (2018.01)
*G07F 17/32* (2006.01)
*A63F 13/20* (2014.01)
*G06F 3/01* (2006.01)
*A63F 13/25* (2014.01)
*A63F 13/214* (2014.01)
*G02B 30/00* (2020.01)

(52) U.S. Cl.
CPC .......... *G06F 3/016* (2013.01); *G07F 17/3206* (2013.01); *G07F 17/3209* (2013.01); *G07F 17/3211* (2013.01); *G07F 17/3218* (2013.01); *H04N 13/279* (2018.05); *H04N 13/366* (2018.05); *A63F 13/214* (2014.09); *A63F 13/25* (2014.09); *G02B 30/00* (2020.01)

(58) Field of Classification Search
CPC ...... A63F 13/285; A63F 13/20; A63F 13/214; A63F 13/25; H04N 13/366; H04N 13/279; G06F 3/012; G06F 3/013; G06F 3/016; G02B 30/00
See application file for complete search history.

(56) References Cited

U.S. PATENT DOCUMENTS

| | | | |
|---|---|---|---|
| 8,684,839 B2 | 4/2014 | Mattice et al. | |
| 8,888,596 B2 | 11/2014 | Kelly et al. | |
| 9,058,714 B2 | 6/2015 | Hamlin et al. | |
| 9,230,395 B2 | 1/2016 | Mattice et al. | |
| 9,400,548 B2 | 7/2016 | Zhang et al. | |
| 9,773,372 B2 | 9/2017 | Froy et al. | |
| 9,895,607 B2 | 2/2018 | Froy | |
| 10,013,061 B2 | 7/2018 | Froy | |
| 2004/0029636 A1 | 2/2004 | Wells | |
| 2004/0192430 A1 | 9/2004 | Burak et al. | |
| 2010/0234094 A1 | 9/2010 | Gagner et al. | |
| 2011/0063725 A1 | 3/2011 | George | |
| 2012/0229718 A1 | 9/2012 | Huang et al. | |
| 2013/0165205 A1* | 6/2013 | Collette | G07F 17/3211 463/20 |
| 2013/0296057 A1 | 11/2013 | Gagner et al. | |
| 2014/0340745 A1 | 11/2014 | Gibilisco et al. | |
| 2015/0235505 A1 | 8/2015 | Keilwert et al. | |
| 2015/0348358 A1 | 12/2015 | Comeau et al. | |
| 2015/0363996 A1 | 12/2015 | Keilwert et al. | |
| 2016/0005263 A1 | 1/2016 | Keilwert et al. | |
| 2016/0071354 A1 | 3/2016 | Hilbert et al. | |
| 2016/0078710 A1 | 3/2016 | Pierer | |
| 2016/0086422 A1 | 3/2016 | Keilwert et al. | |
| 2016/0086423 A1 | 3/2016 | Keilwert et al. | |
| 2016/0171814 A1 | 6/2016 | Froy et al. | |
| 2016/0171816 A1 | 6/2016 | Leblanc et al. | |
| 2016/0175701 A1 | 6/2016 | Froy et al. | |
| 2016/0175709 A1 | 6/2016 | Idris et al. | |
| 2016/0180636 A1 | 6/2016 | Froy et al. | |
| 2016/0180644 A1* | 6/2016 | Idris | G07F 17/3225 463/20 |
| 2016/0189469 A1 | 6/2016 | Post | |
| 2016/0232742 A1 | 8/2016 | Keilwert et al. | |
| 2016/0292969 A1 | 10/2016 | Dupuis et al. | |
| 2017/0148250 A1 | 5/2017 | Angermayer et al. | |
| 2017/0165566 A1 | 6/2017 | Froy | |
| 2017/0165573 A1 | 6/2017 | Froy et al. | |
| 2017/0168570 A1 | 6/2017 | Froy | |
| 2017/0169649 A1 | 6/2017 | Froy et al. | |
| 2017/0169651 A1 | 6/2017 | Froy et al. | |
| 2017/0169653 A1 | 6/2017 | Froy et al. | |
| 2017/0169656 A1 | 6/2017 | Froy | |
| 2017/0169657 A1 | 6/2017 | Keilwert et al. | |
| 2017/0169658 A1 | 6/2017 | Froy et al. | |
| 2017/0169659 A1 | 6/2017 | Froy | |
| 2017/0169662 A1 | 6/2017 | Froy et al. | |
| 2017/0169663 A1 | 6/2017 | Froy | |
| 2017/0169664 A1 | 6/2017 | Froy et al. | |
| 2017/0294072 A1 | 10/2017 | Achmüller et al. | |

OTHER PUBLICATIONS

Time-of-flight camera, Wikipedia, https://en.wikipedia.org/wiki/Time-of-flight_camera, printed Sep. 19, 2016 (12 pages).

\* cited by examiner

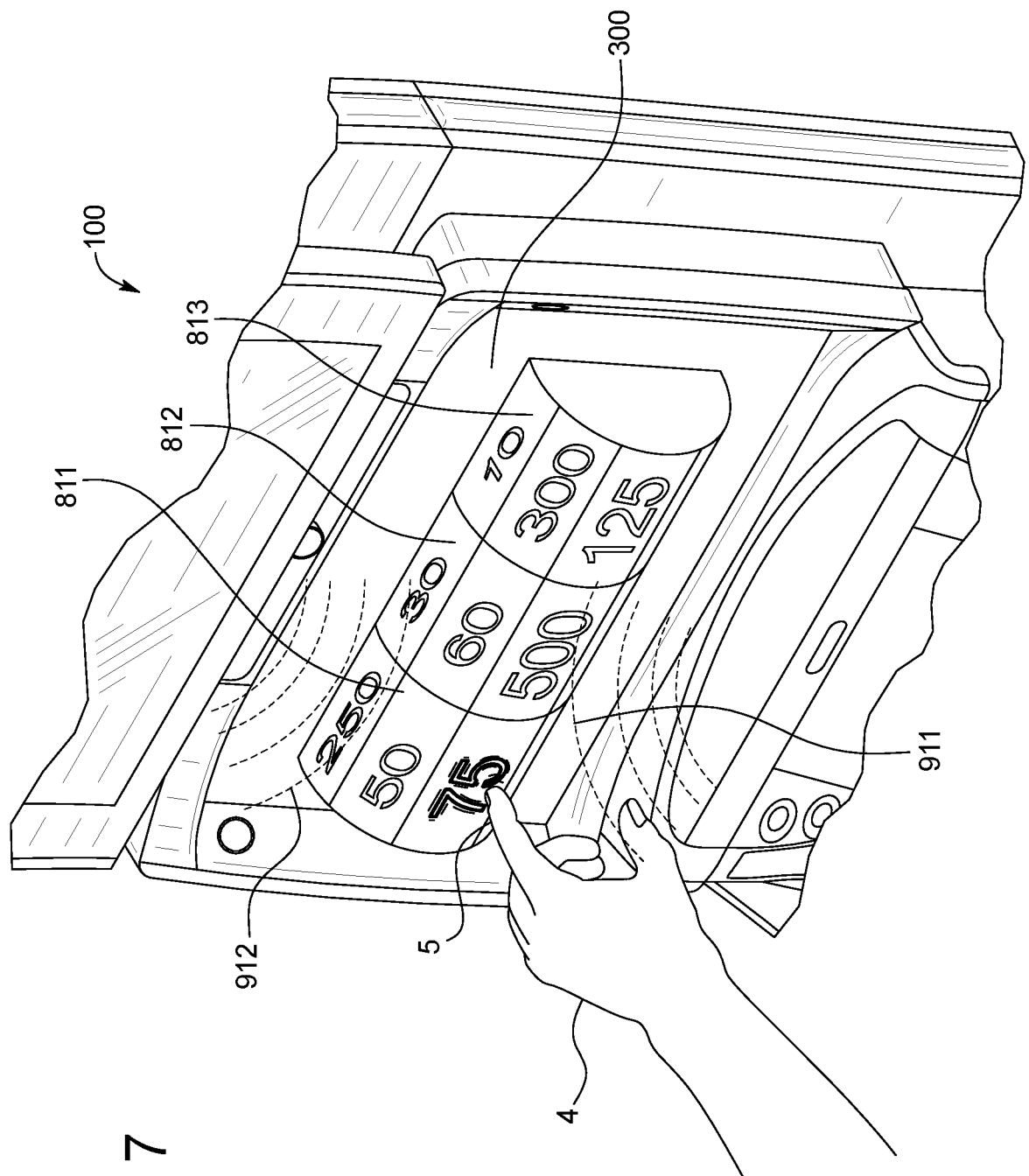

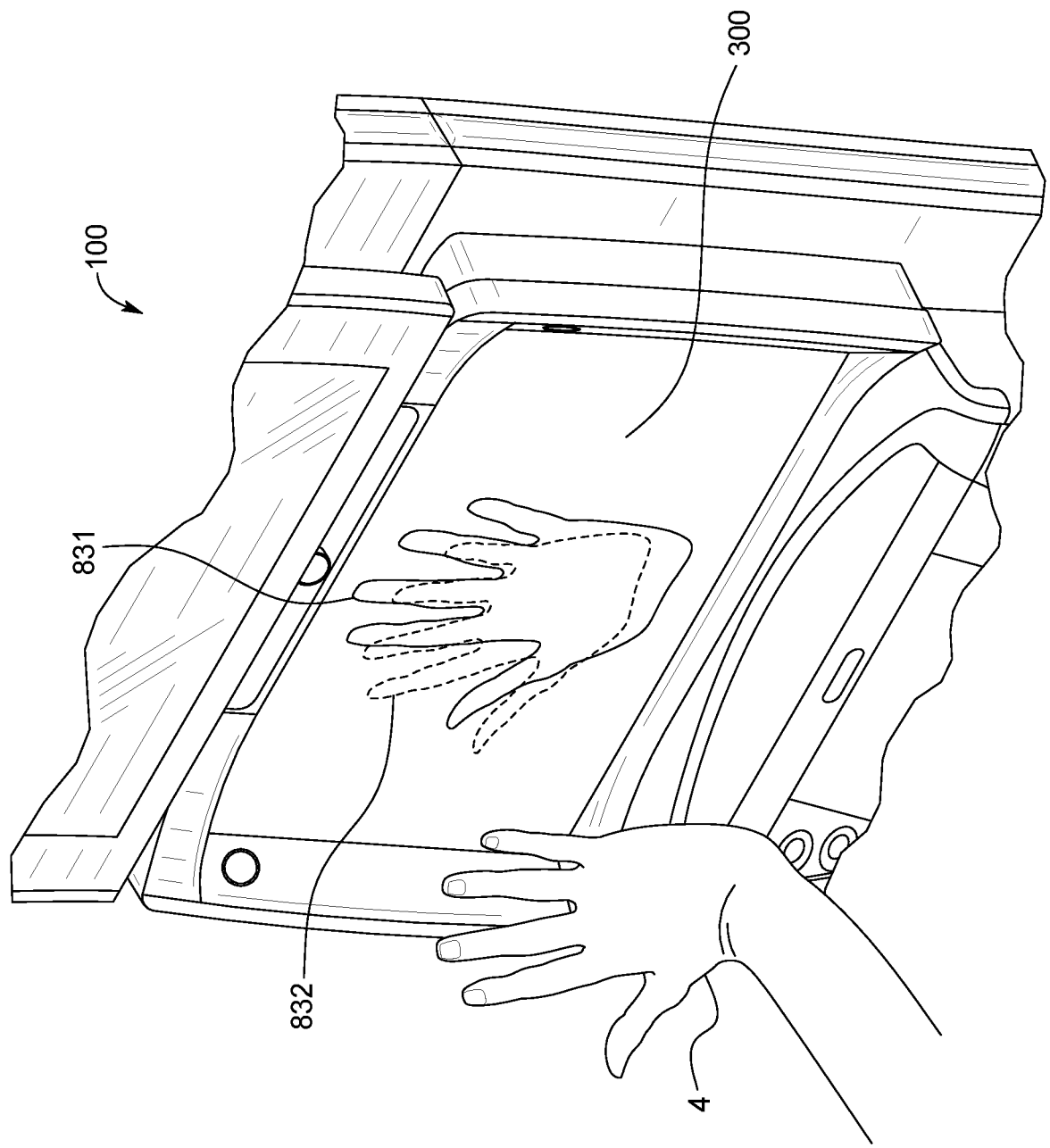

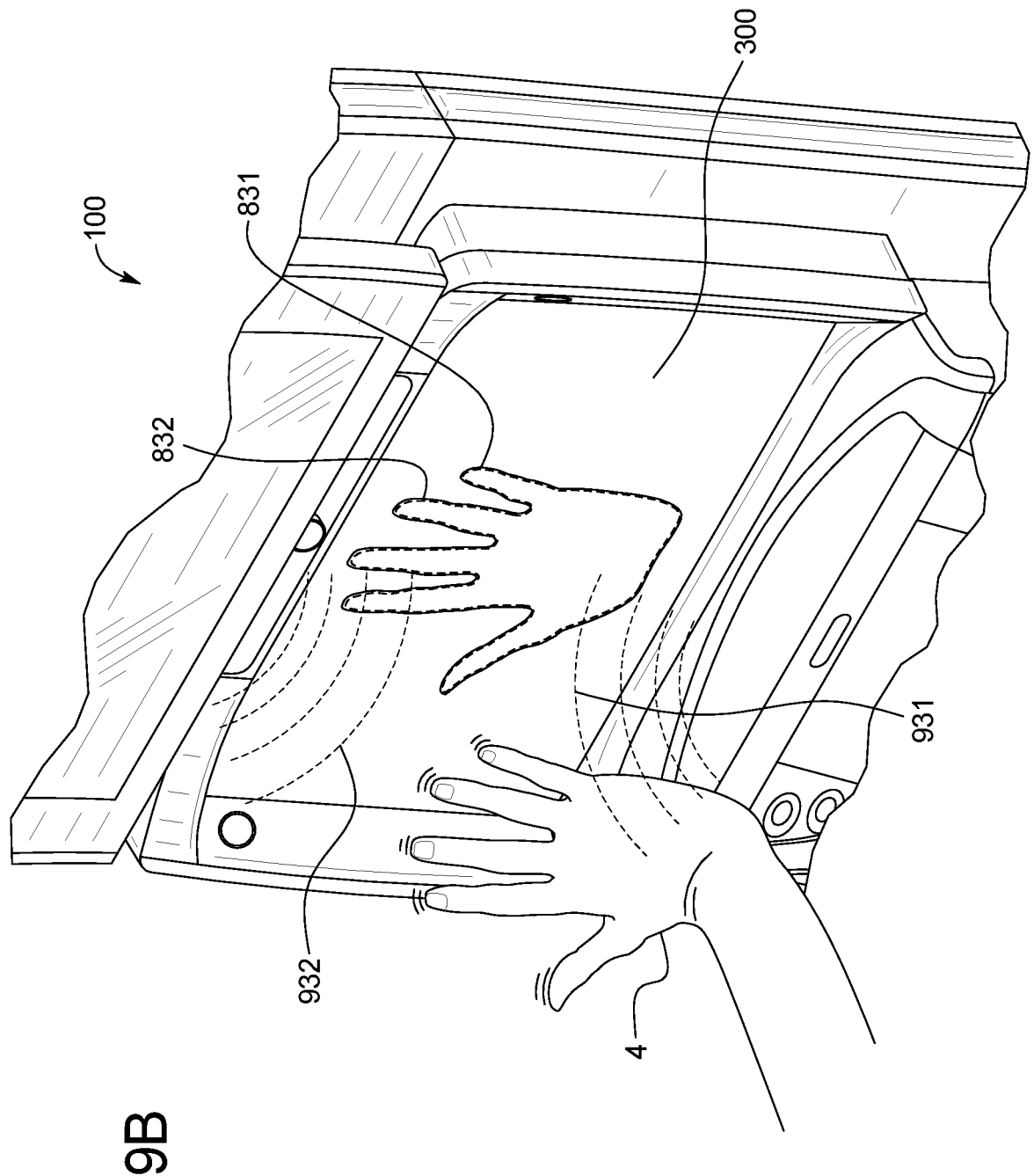

ELECTRONIC GAMING MACHINE AND METHOD PROVIDING ENHANCED PHYSICAL PLAYER INTERACTION

PRIORITY CLAIM

This application claims priority to U.S. Provisional Patent Application Ser. No. 62/398,272, filed Sep. 22, 2016, the entire contents of which are incorporated herein by reference.

COPYRIGHT NOTICE

A portion of this patent document contains material subject to copyright protection. The copyright owner does not object to photocopy reproduction of the patent document in the form it appears in the U.S. Patent and Trademark Office records, but otherwise reserves all copyright rights.

BACKGROUND

Electronic gaming machines ("EGMs") operable to enable play of wagering games are well known. A typical wagering game includes a primary or base game, and certain EGMs also include one or more secondary or bonus games.

Generally, various know EGMs initiate a play of the primary game following: (1) receipt of a wager input by the player (such as an actuation of a wager button by a player) that indicates how much the player desires to wager; and/or (2) receipt of a game initiation input by the player (such as an actuation of a play button by the player). Many of these EGMs determine any primary awards for a wagered-on play of the primary game based on a randomly determined outcome of the play of the primary game (such as the randomly determined position that each of the reels of a slot EGM will stop at) and the wager amount. Other EGMs determine any primary awards for a wagered-on play of the primary game based on randomly determined symbols of the play of the primary game and player inputs (such as randomly determined cards from a deck of cards and player selection of any cards to hold in a video draw poker EGM) and the wager amount. Typically, the larger the wager amount, the larger the primary award (for the same outcome). Winning outcomes that are less likely to occur usually result in larger primary awards than winning outcomes that are more likely to occur.

EGMs operable to enable play of a bonus game usually initiate a play of the bonus game upon an occurrence of a bonus triggering event. These EGMs determine any bonus awards for the play of the bonus game based on the outcome of the play of the bonus game and the wager amount. Many of these known bonus games include player interaction that requires the player to make one or more inputs such as selecting one or more selections or making one or more decisions.

SUMMARY

The electronic gaming machine and methods of the present disclosure provide electronic gaming machines and methods of operating electronic gaming machines that provide enhanced physical player interaction.

In various embodiments, the electronic gaming machine comprises: a housing; a display device supported by the housing; a player eye or head tracker supported by the housing; a player hand position locator supported by the housing; a player tactile feedback provider supported by the housing; at least one input device supported by the housing; at least one processor; and at least one memory device that stores a plurality of instructions.

In various embodiments, the electronic gaming machine comprises: a display device including at least one lenticular lens, and configured to display 3D images; a player eye or head tracker including at least one camera positioned adjacent to the display device; a player hand position locator including at least one camera positioned adjacent to the display device; a player tactile feedback provider including ultrasonic transducers positioned adjacent to the display device; at least one input device; at least one processor; and at least one memory device that stores a plurality of instructions.

Additional features and advantages are described in, and will be apparent from, the following Detailed Description and the Figures.

BRIEF DESCRIPTION OF THE FIGURES

FIG. 7 is an enlarged fragmentary front perspective view of the central portion of the EGM of FIG. 1, showing the EGM displaying in 3D three reels in the player interaction zone in front of the first display device and a player hand touching one of the three reels, and showing the player hand being subjected to sound waves shown in phantom that cause a sensation in the player's hand.

FIG. 9A is an enlarged fragmentary front perspective view of the central portion of the EGM of FIG. 1, showing the EGM displaying in 3D a player hand position, and showing a player hand in the player interactive zone that is not yet aligned with the displayed player hand.

FIG. 9B is an enlarged fragmentary front perspective view of the central portion of the EGM of FIG. 1, showing the EGM displaying in 3D a player hand position, showing a player hand in the player interactive zone that is aligned with the displayed player hand, and showing the player hand being subjected to sound waves shown in phantom that cause a sensation in the player's hand.

DETAILED DESCRIPTION

Figure 1:
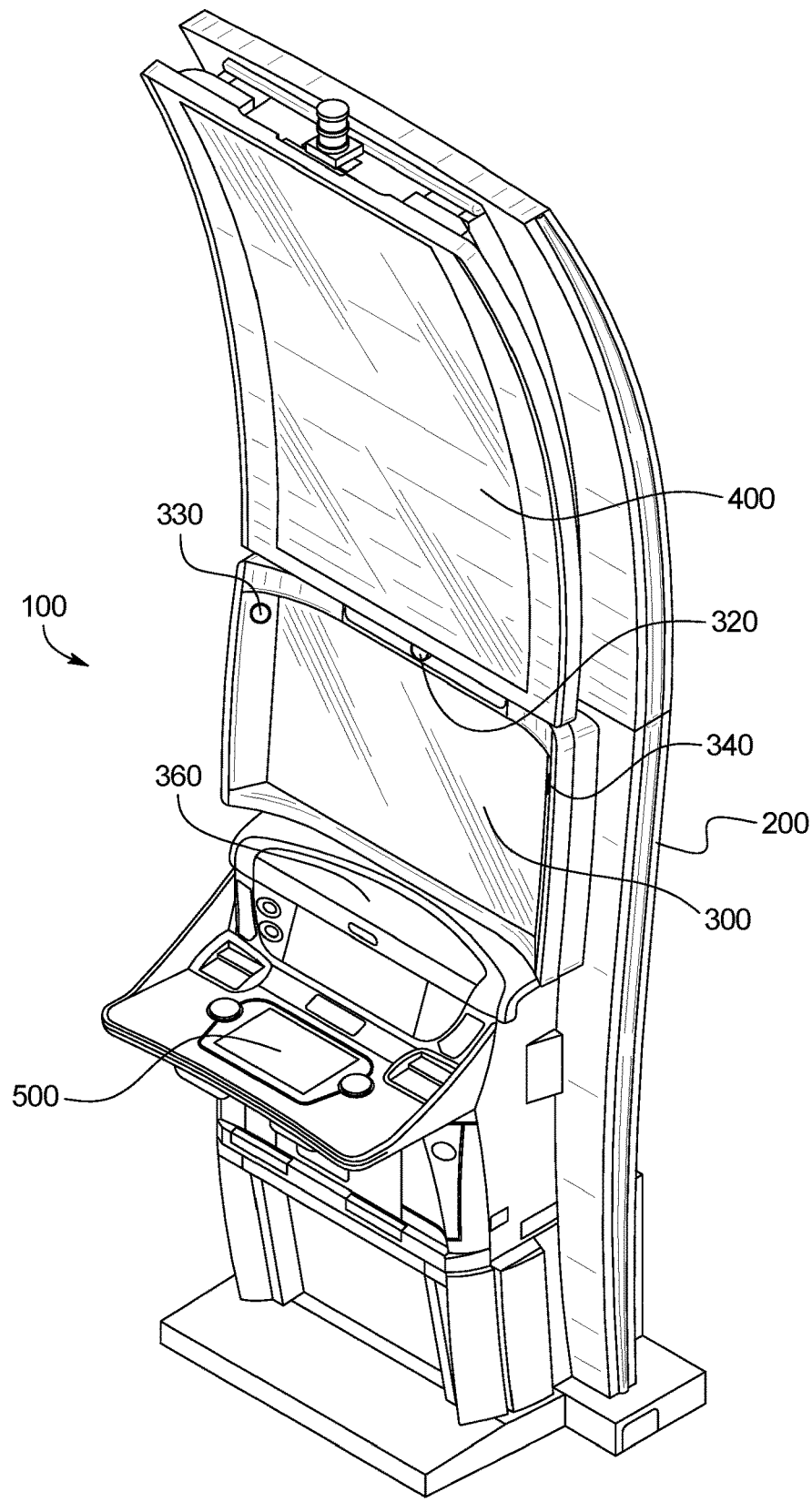
FIG. 1 is a front perspective view of one example embodiment of the electronic gaming machine ("EGM") of the present disclosure.
Figure 2:
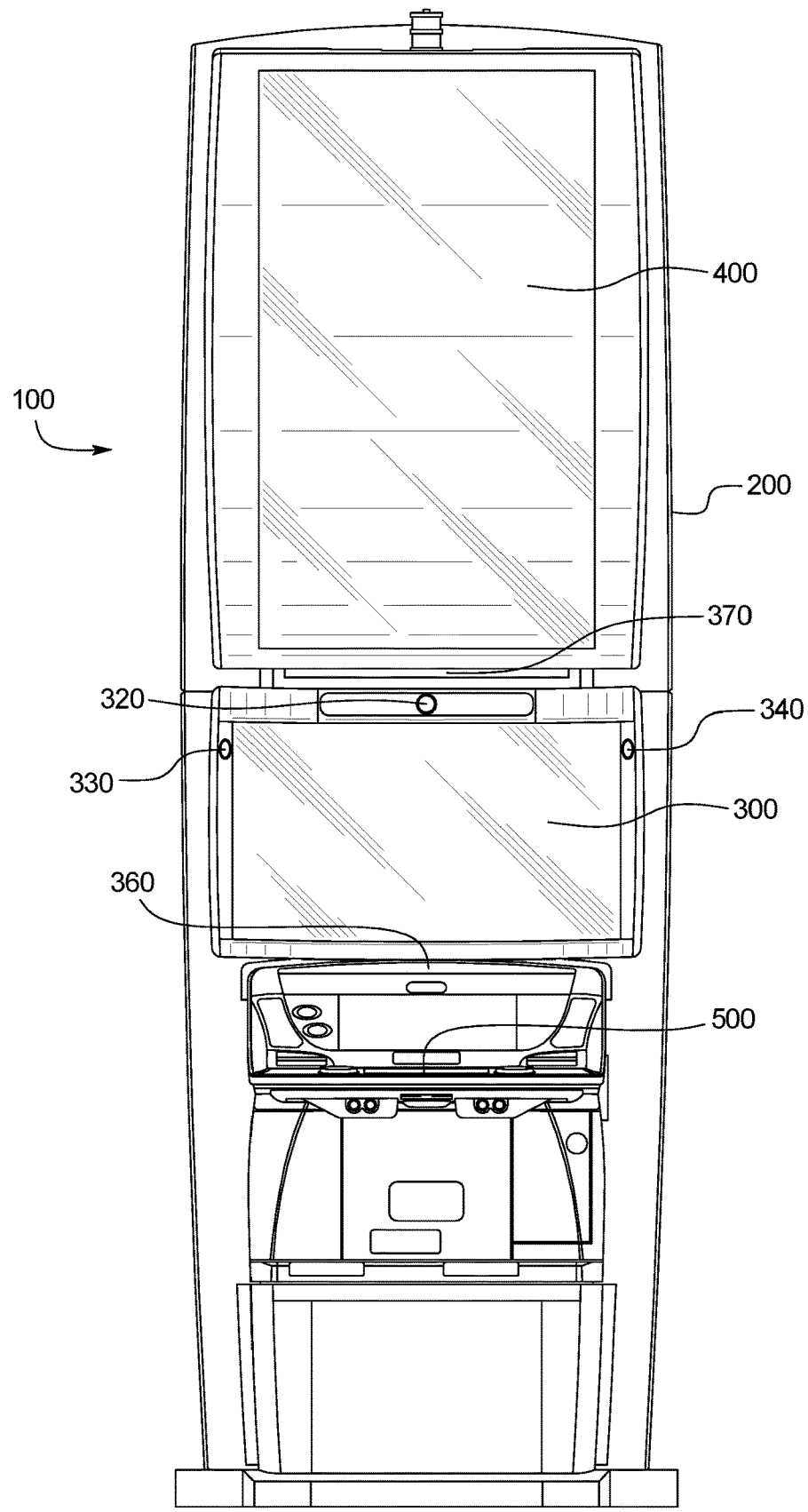
FIG. 2 is a front view of the EGM of FIG. 1.
Figure 3:
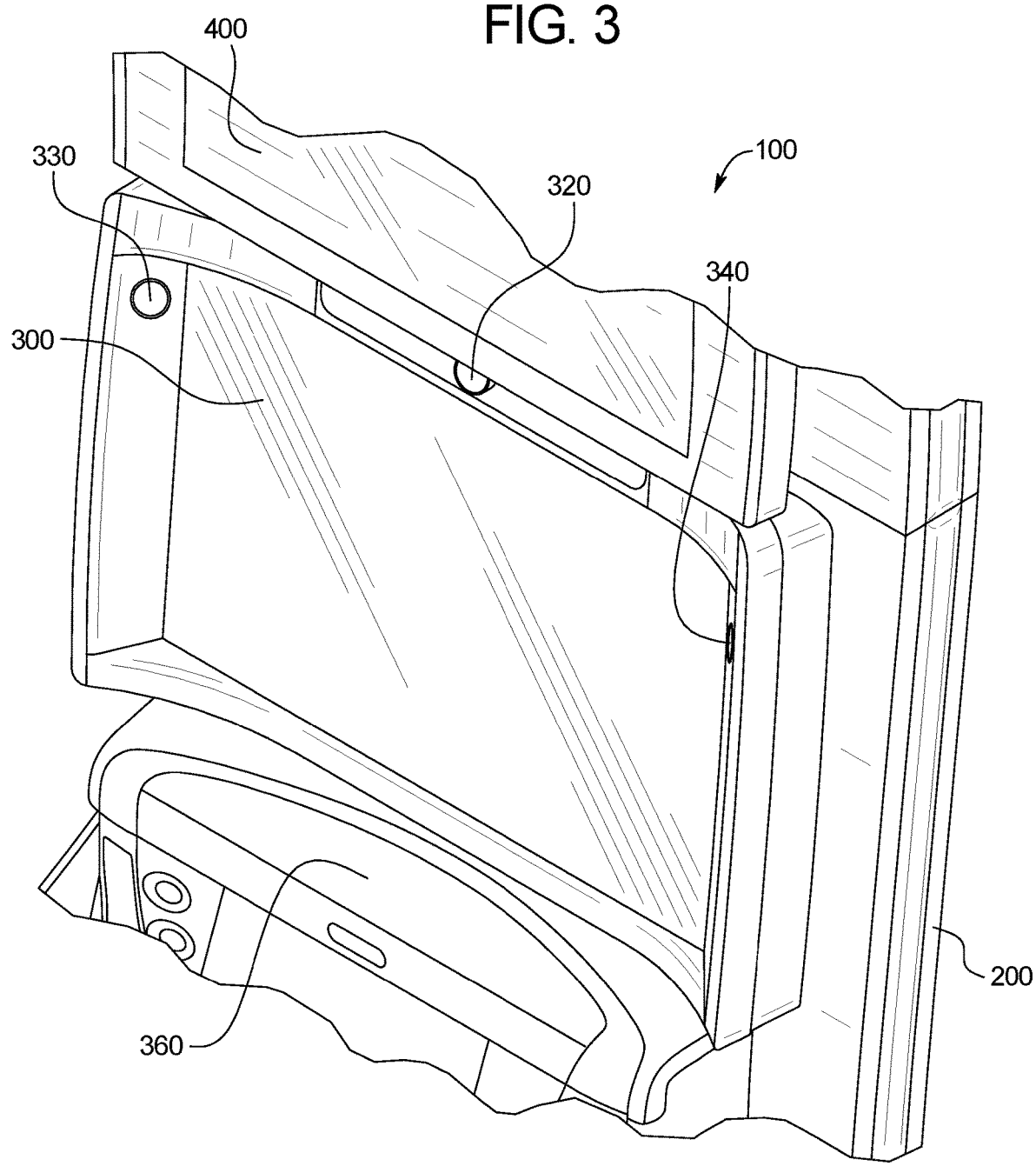
FIG. 3 is an enlarged fragmentary perspective view of the central portion of the EGM of FIG. 1.
Figure 4:
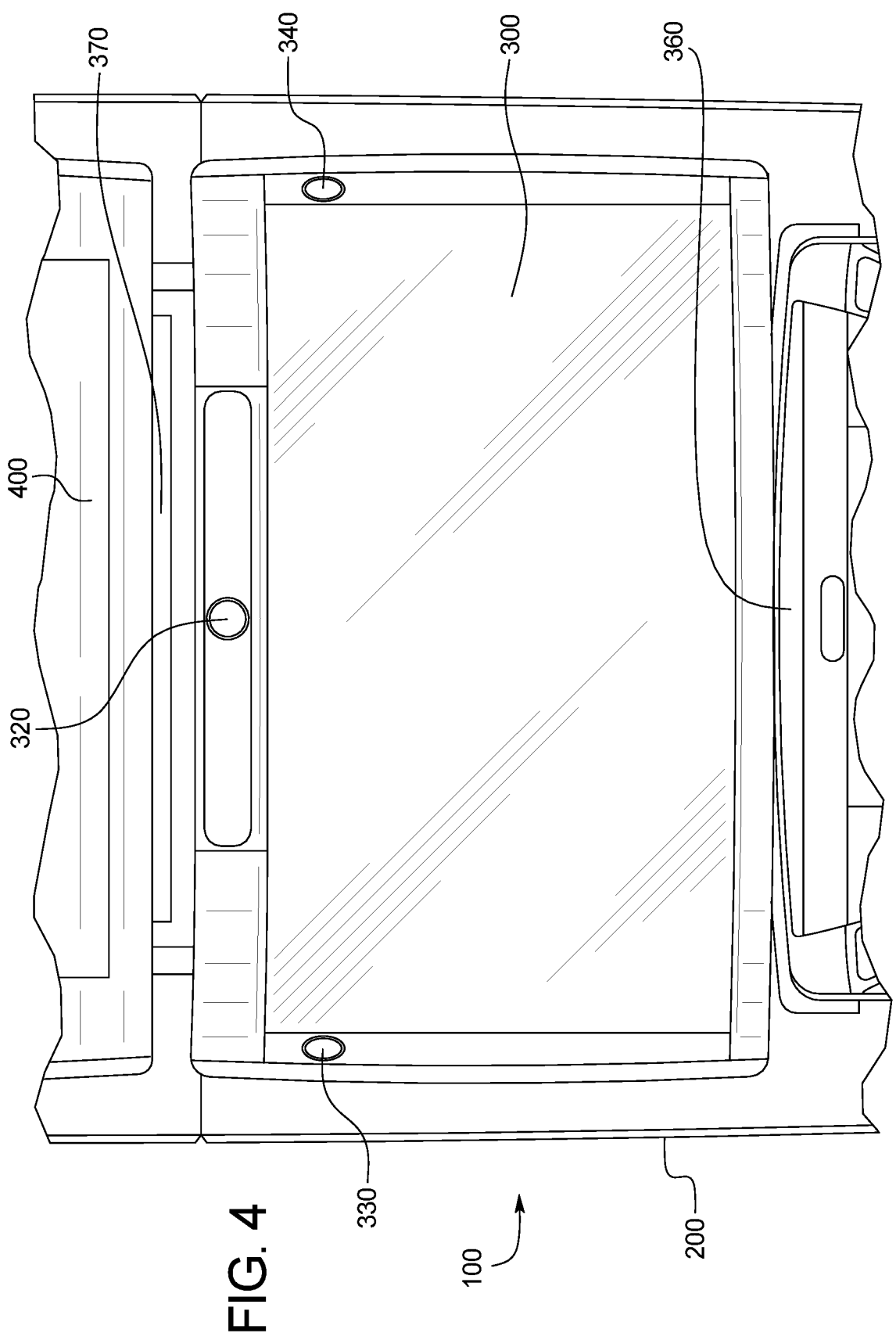
FIG. 4 is an enlarged fragmentary front view of the central portion of the EGM of FIG. 1.
Figure 5A:
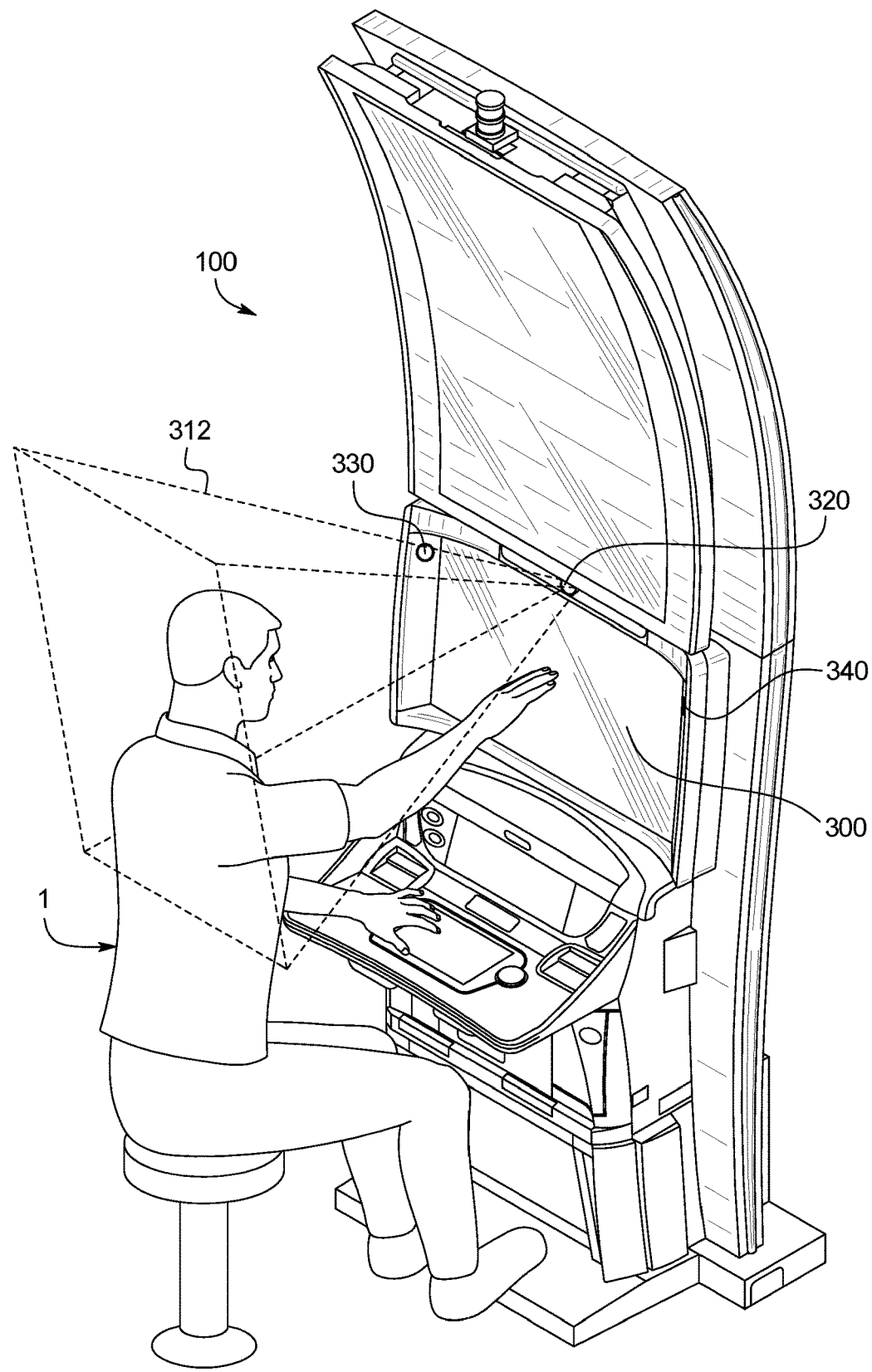
FIG. 5A is a front perspective view of the EGM of FIG. 1, showing in phantom a player eye or head tracking zone provided by the EGM.
Figure 5B:
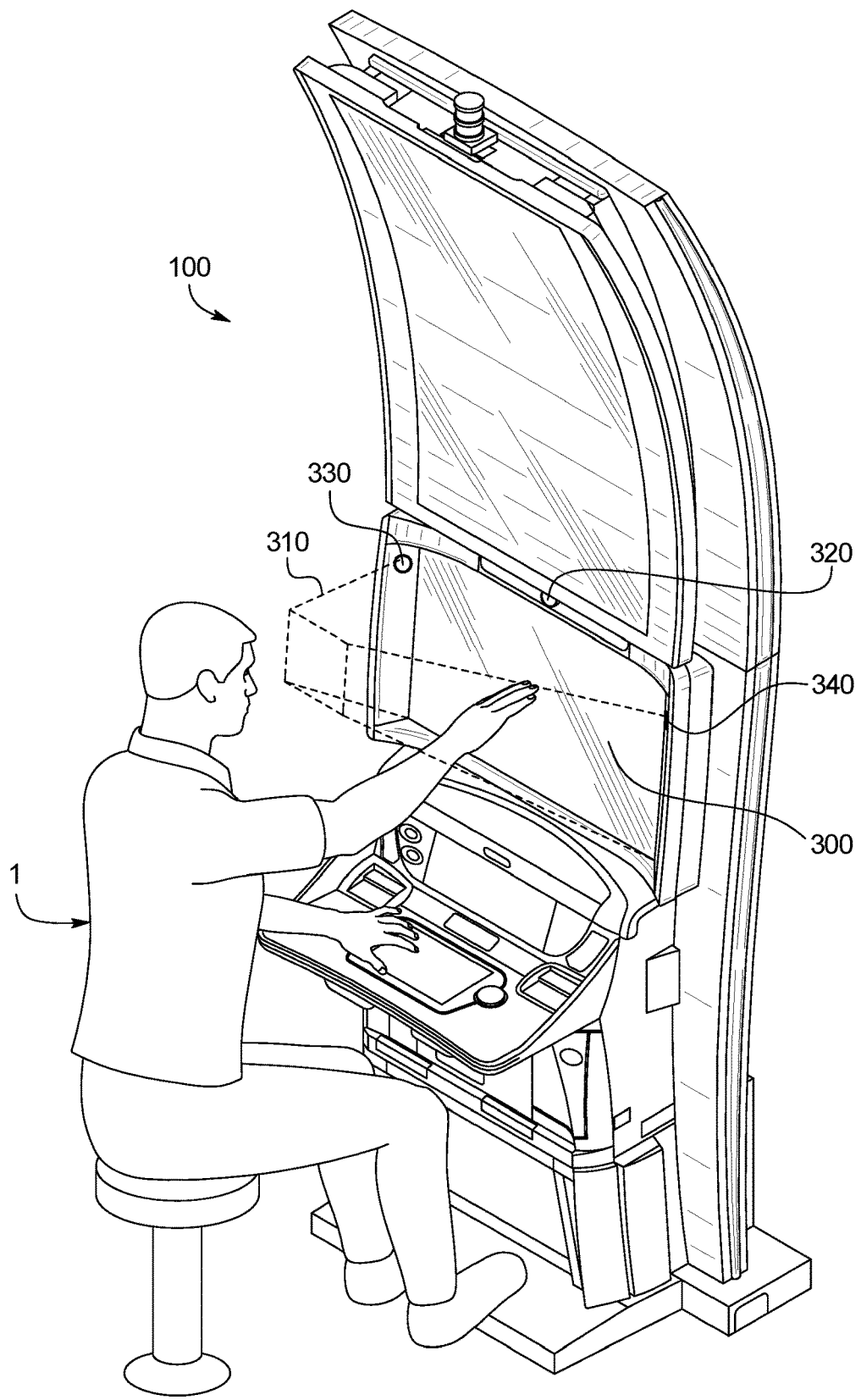
FIG. 5B is a front perspective view of the EGM of FIG. 1, showing in phantom a player interactive zone provided by the EGM.
Figure 5C:
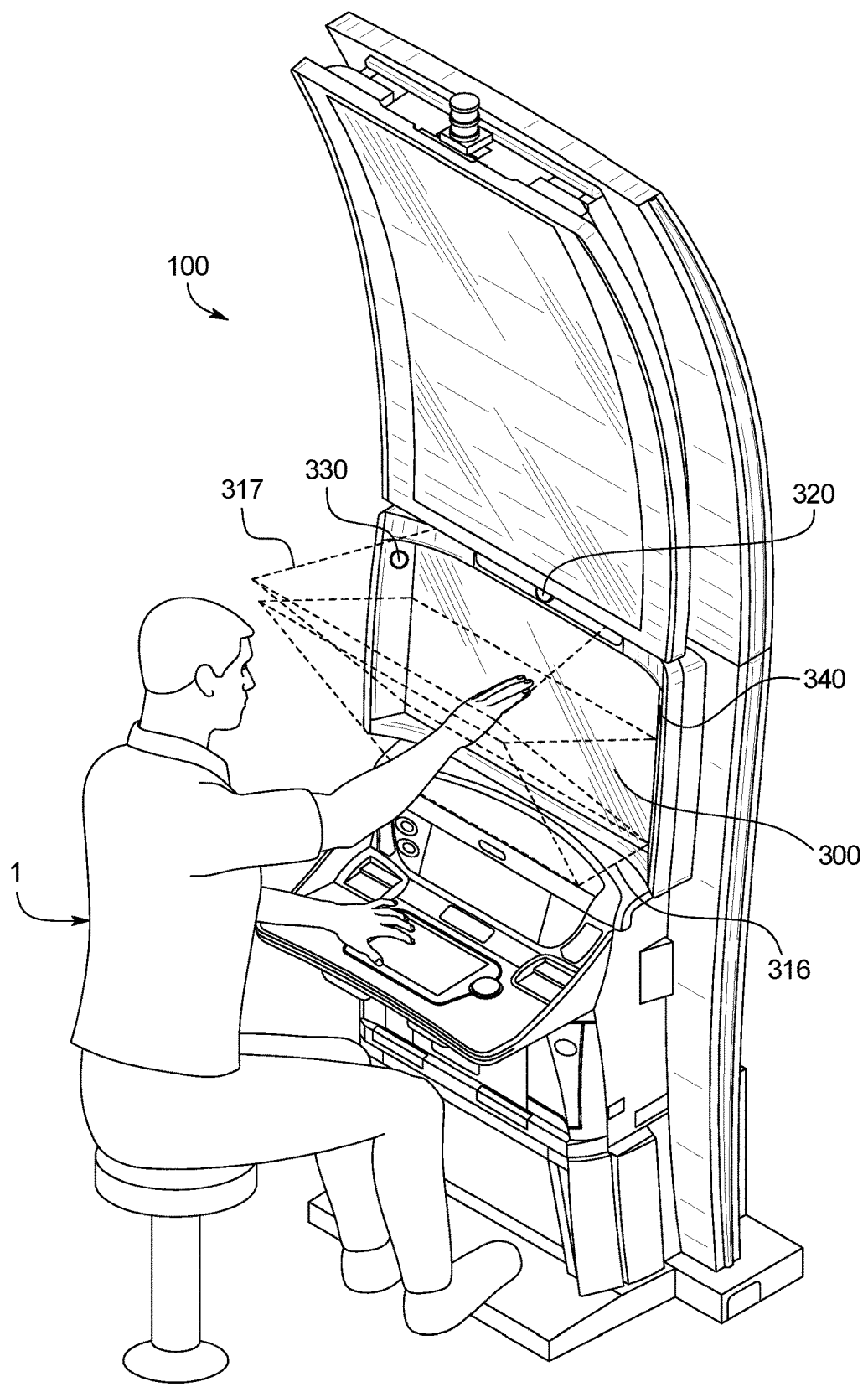
FIG. 5C is a front perspective view of the EGM of FIG. 1, showing in phantom upper and lower player haptic or sensation zones provided by the EGM.
Figure 5D:
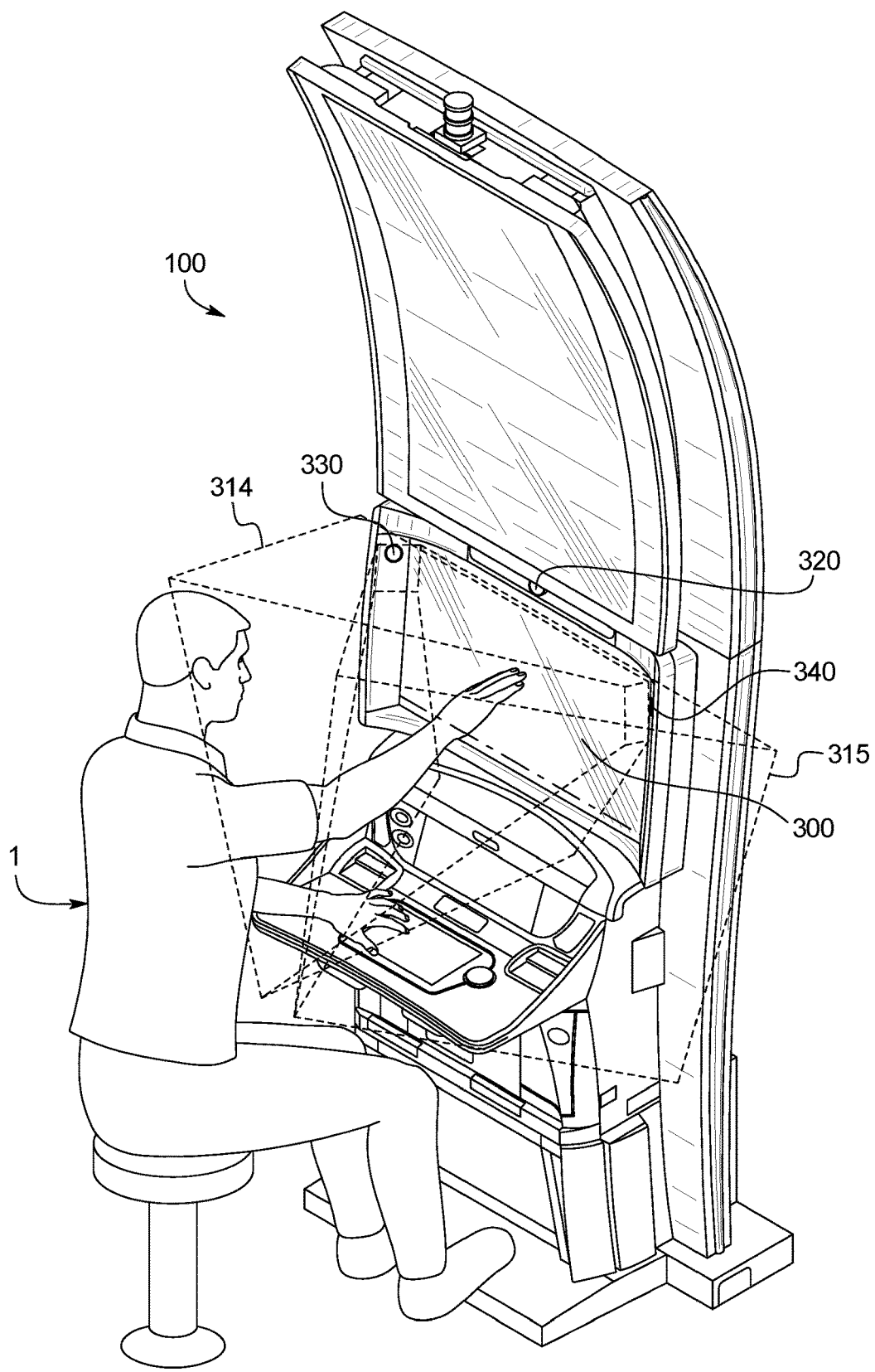
FIG. 5D is a front perspective view of the EGM of FIG. 1, showing in phantom left and right player hand location zones provided by the EGM.

The present disclosure provided new EGMs and methods of operating such new EGMs. For brevity and clarity, and unless specifically stated otherwise, the term "EGM" is used herein to refer to an electronic gaming machine (such as but not limited to a slot machine, a video poker machine, a video card machine, a video lottery terminal (VLT), a video keno machine, or a video bingo machine). For brevity, the term "3D images" used herein includes any 3D image or 3D images or other content shown in 3D such as but not limited to moving or transforming 3D geometries, 3D videos, or movies, etc.

In various embodiments of the present disclosure, the EGM includes: (a) a display device configured to display 3D images to a player without requiring the player to wear 3D glasses, (b) a player eye or head tracker configured to track movement of either the eyes or the head of the player, (c) a player hand position locator configured to track or determine one or more positions of at least one of the player's hands in a player interaction zone in front of the display device, and (d) a player tactile feedback provider configured to provide tactile feedback to at least one of the player's hands in the player interaction zone based on the determined position(s) of the player's hand(s). In various embodiments of the present disclosure, the EGM further includes at least one input device, at least one processor, and at least one memory device that stores a plurality of instructions that, when executed by the at least one processor, cause the at least one processor to operate with the display device, the player eye or head tracker, the player hand position locator, the player tactile feedback provider, and the at least one input device to provide one or more plays of primary and/or bonus games (or other functionality) with enhanced physical player interaction. In these embodiments, the EGM can use the player tactile feedback provider to produce one or more sensations in the player's hand(s) in the player interaction zone at the position(s) of the player's hand(s) determined by the player hand position locator on a real time or substantially real time basis to give the player the sensation that the player is actually touching or feeling or interacting with a physical object in the player interaction zone in front of the player (or otherwise physically interacting with the display device or EGM).

More specifically, in various embodiments of the present disclosure, the EGM includes: (a) a display device including one or more lenticular lenses configured to display 3D images to a player without requiring the player to wear 3D glasses, (b) a player eye or head tracker including at least one camera positioned above the display device and configured to track movement of either the eyes or the head of the player, (c) a player hand position locator including cameras positioned to the right and left of the display device and configured to track or determine one or more positions of at least one of the player's hands in front of the display device, and (d) a player tactile feedback provider including ultrasonic transducers or transducer arrays positioned above and below the display device and configured to provide tactile feedback to at least one of the player's hand based on the determined position(s) of the player's hand(s). In various such embodiments of the present disclosure, the EGM further includes at least one input device, at least one processor, and at least one memory device that stores a plurality of instructions that, when executed by the at least one processor, cause the at least one processor to operate with the display device, the player eye or head tracker, the player hand position locator, the player tactile feedback provider, and the at least one input device to provide one or more plays of primary or bonus games (or other functionality) with enhanced physical player interaction. In these embodiments, the EGM can use the ultrasonic transducers or transducer arrays to produce one or more sound waves that cause sensations in the player's hand(s) in the player interaction zone at the position(s) of the player's hand(s) determined by the cameras positioned to the right and left of the display device on a real time or substantially real time basis to give the player the sensation(s) that the player is actually touching or feeling or interacting with a physical object in the player interaction zone in front of the player (or otherwise physically interacting with the display device).

In various embodiments of the present disclosure, the EGM can provide the enhanced physical player interaction in conjunction with one or more various game components (such as but not limited to game symbols, game cards, game reels, game wheels, game tiles, game dice, game chips, game balls, game selections, game characters, game awards, game outcomes, or other game objects) or other functional aspects or functionality provided by the EGM to or for the player.

Certain of the components of the EGM of the present disclosure including those that co-act to provide the enhanced physical player interaction provided by the EGM are first discussed below under the EGM—ENHANCED PHYSICAL PLAYER INTERACTION PRIMARY COMPONENTS section heading. The various other components that can be provided with the EGM of the present disclosure are then subsequently discussed below under the EGM—GENERAL COMPONENTS AND OPERATION section heading. These headings are not meant to limit the scope of the present disclosure in any manner. It should also be appreciated that the present disclosure can be used in other suitable machines.

I. EGM—Enhanced Physical Player Interaction Primary Components

Referring now to FIGS. 1, 2, 3, 4, 5A, 5B, 5C, and 5D, one example EGM of the present disclosure is generally illustrated and indicated by numeral 100. This example EGM 100 illustrated in FIGS. 1, 2, 3, 4, 5A, 5B, 5C, and 5D generally includes a support structure or cabinet 200 that supports a plurality of output devices and a plurality of input devices of the EGM 100, among other components. In this illustrated example embodiment, the plurality of output devices includes: (a) a first or intermediate display device 300; (b) a second or upper display device 400 positioned above the first or intermediate display device 300; and (c) a third or lower display device 500 positioned below the first or intermediate display device 300. These output devices are configured to display the games, game outcomes, awards (such as the primary and secondary games awards or other game outcome awards), and other functionality and information to the player. In this illustrated example embodiment, the plurality of player input devices enable the player to play one or more wagering games provided by the EGM. Such player input devices can also include one or more of the input devices described below in the second section of this detailed description. These player input devices are physically touchable or activatable by the player to enable the player to make inputs into the EGM. These output devices and input devices are configured such that a player may operate the EGM while standing or sitting, but preferably operates the EGM while the player is sitting in front of the EGM 100 such that the player's head is approximately at the same height as the first display device 300 (as generally shown in FIGS. 5A, 5B, 5C, and 5D).

In various embodiments of the present disclosure, the EGM of the present disclosure includes: (a) the first display device configured to display three-dimensional ("3D") images to the player without requiring the player to wear 3D glasses; (b) a player eye or head tracker configured to track the movement of the eyes and/or head of the player; (c) a player hand position locator configured to track the position(s) of at least one of the player's hands in a player interaction zone in front of the first display device; (d) a player tactile feedback provider configured to provide tactile feedback to at least one of the player's hands in the player interaction zone; and (e) one or more processors and memory devices that co-act or work together with the above mentioned components to provide the enhanced physical player interaction with the EGM. It should be appreciated that: (a) the first display device; (b) the player eye or head tracker; (c) the player hand position locator; and (d) the player tactile feedback provider, may each be individually configured or may alternatively be configured to operate with the one or more processors and memory devices to provide each of their designated functions described herein. In other words, (a) the first display device may be individually configured to display 3D or may be configured to operate with the one or more processors and memory devices to display the 3D images; (b) the player eye or head tracker may be individually configured to track the movement of the eyes and/or head of the player or may be configured to operate with the one or more processors and memory devices to track the movement of the eyes and/or head of the player; (c) the player hand position locator may individually be configured to track the position(s) of at least one of the player's hands or may be configured to operate with the one or more processors and memory devices to track the position(s) of at least one of the player's hands; and (d) the player tactile feedback provider may be individually configured to provide tactile feedback to at least one of the player's hands or may be configured to operate with one or more processors and memory devices to provide tactile feedback to at least one of the player's hands. Thus, for purposes of this disclosure and for brevity, each of these devices are sometimes discussed as performing such tasks individually or operating with the one or more processors and memory devices to perform such tasks, and such descriptions are not intended to limit the present disclosure to either configuration.

In certain embodiments, the first display device, the player eye or head tracker, the player hand position locator, the player tactile feedback provider, the one or more processor(s), and the one or more memory device(s) are configured to provide the enhanced physical player interaction of the present disclosure by operating on a real time or substantially real time basis to: (a) cause the first display device to display 3D images such that the player in front of the first display can see one or more virtual objects in a player interaction zone in front of the first display device or projecting toward the player; (b) determine movements of the player's eyes or head and cause the first display device to vary the display relating to the virtual object(s) in the player interaction zone based on such player eye or head movements; (c) determine the positions of one or more of the player's hands positioned in the player interaction zone in front of the display device; (d) determine or estimate the position(s) of the player's hand(s) relative to the apparent positions of the virtual objects displayed in the player interaction zone; and (e) enable the player to interact with the virtual objects in the player interaction zone in part by changing the display of the objects based on the position(s) of the player's hand(s) and in part based on causing a physical interaction with the player's hand(s) to occur in the player interaction zone at the position(s) of the virtual object(s), thus giving the player a sense that the player actually touched one or more of the virtual objects as if the virtual object(s) were physical objects floating in the player interaction zone. In various embodiments, this physical interaction is provided by one or more choreographed haptic events that the player can physically feel or sense on the player's hand(s) or finger(s). In various embodiments, the choreographed haptic event(s) include one or more sound waves directed at the player's hand(s) or finger(s) that provide the player a feeling or sensation that the player is actually touching the virtual object in the player interaction zone or otherwise interacting with the EGM without actually touching the EGM.

More specifically, in this illustrated example embodiment, the first display device 300 of the EGM 100 that is configured to display one or more 3D images to the player without requiring the player to wear 3D glasses includes one or more lenticular lens (not shown). In various embodiments, the first display device 300 including the lenticular lens is configured to display or project what appears to the player as one or more 3D virtual objects that are projected towards the player or projected in the player interaction zone (such as the player interaction zone 310 shown in FIG. 5B) in front of the player 1. In various embodiments, the first display device 300 including the lenticular lens is configured to display or project what appears to the player as one or more 3D virtual objects that appear to the player to be behind the front face or screen of the display device.

In this illustrated embodiment, the player interaction zone 310 extends in front of the display device 300 in somewhat of a cone shape. However, it should be appreciated that in other embodiments, the player interaction zone can be alternatively configured, such as to extend: (a) from a horizontal plane level with a top edge of the display device to a horizontal plane level with a bottom edge of the display device; (b) from a vertical plane level with a right side edge of the display device to a vertical plane level with a left side edge of the display device; and (c) from a vertical plane from a front face of the display device to a vertical plane approximately twelve inches from the front surface of the display device. In other embodiments, the player interaction zone can be alternatively configured to extend: (a) from a horizontal plane level with the top edge of the display device to a horizontal plane level with the bottom edge of the display device; (b) from a vertical plane level with the right side edge of the display device to a vertical plane level with the left side edge of the display device; and (c) from a vertical plane from the front face of the display device to vertical plane approximately twelve inches from the front surface of the display device. It should thus be appreciated that the size and shape of the player interaction zone may vary in accordance with the present disclosure.

It should also be appreciated that the size and shape of the player interaction zone may vary as the position of the player's eyes or head change in accordance with the present disclosure. In certain such embodiments, the far end of the cone is centered at the player's eyes or head, and when the player's eyes or head move, the player interaction zone changes.

It should also be appreciated that other suitable 3D or virtual object displaying systems or devices can be employed in accordance with the present disclosure.

In this illustrated example embodiment, the player eye or head tracker of the EGM 100 that is configured to track the movement of the eyes or head of the player includes one or more eye tracking or head tracking cameras such as eye tracking or head tracking camera 320 supported by the cabinet 200 and positioned directly above the display device 300. The eye tracking or head tracking camera 320 is configured to track the position of the player's eyes or the player's head as they move in front of the display device 300. More specifically, the eye tracking or head tracking camera 320 is configured to track the position of the player's eyes or the player's head as they move in an eye/head tracking zone such as the eye/head tracking zone 312 shown in front of the EGM 100 in FIG. 5A. In the embodiments where two or more eye tracking or head tracking cameras are employed, such multiple cameras work together to track the position of the player's eyes or the player's head as they move in front of the display device 300. In various embodiments, such multiple cameras are spaced apart, such as spaced apart 6 inches.

In various embodiments, the processor(s), memory device(s), the player eye or head tracker, and the display device of the EGM 100 align the coordinate system of the virtual display area (or world) with the real world by using the head position information obtained from the player eye or head tracker. When the player moves his head around, the display device of the EGM 100 causes the virtual object(s) to appear to the player to stay in place where it is. Therefore, the EGM 100 uses the head position to fix the object(s) in space. The actual 2D stereo projection by the display device changes according to the head position, but to the player, the virtual object(s) appears or seems to stay where it is.

It should be appreciated that the location of the eye/head tracking zone may vary in accordance with the present disclosure. It should be appreciated that the eye/head tracking zone may vary in accordance with the present disclosure based on the configuration and position of the eye tracking or head tracking camera. It should also be appreciated that more than one eye tracking or head tracking cameras may be employed in the EGM in accordance with the present disclosure. It should further be appreciated that the one or more eye tracking or head tracking cameras may be employed in the EGM in different positions adjacent to the display device or elsewhere on the EGM in accordance with the present disclosure. It should also be appreciated from the above and from FIG. 5B that in certain embodiments of the present disclosure, the player's head (and eyes) are expected to be outside of the player interaction zone 310.

The first display device 300, the eye tracking or head tracking camera 320, the one or more processor(s), and the one or more memory device(s) co-act or operate to track the player's eyes or head movements in the eye/head tracking zone 312 in relation to the first display device 300 and the player interaction zone 310 and to adjust the display or projection of each of the virtual object(s) in the player interaction zone 310 based on the player's eye or head movements. In various embodiments, the first display device 300 adjusts the image(s) to be seen by the player's left and right eyes based on the determined position(s) and movement(s) of the player's eyes or head.

The lenticular lens facilitates the perception of two different images for the left and right eye of the player. In other words, the lenticular lens causes certain pixels of the screen to be visible only to the player's right eye and certain other pixels of the screen to be visible only to the left eye of the player. When the player's head position is changed, the display device also changes the pixel positions for the left eye and the right eye of the player. The head position or changes thereto determined by the eye or head tracker are used by the EGM to choose or select the correct pixels for the left eye and the right eye of the player.

It should also be appreciated that other suitable eye tracking or head tracking systems or devices can be employed in accordance with the present disclosure.

In this illustrated example embodiment, the player hand position locator of the EGM 100 that is configured to track or determine the position(s) of at least one of the player's hands in front of the first display device 300 in the right and left player hand tracking zones 314 and 315 (shown in FIG. 5D) includes a plurality of cameras 330 and 340 supported by the cabinet 200 and positioned adjacent to the first display device 100. In this illustrated embodiment, one camera 330 is positioned directly to the right of the display device 300 (looking forward) and one camera 340 positioned directly to the left of the display device 300 (looking forward). In this illustrated embodiment, the plurality of cameras 330 and 340 are positioned adjacent to an upper right hand corner of the display device 300 and the other of the plurality of camera is positioned adjacent to an upper left hand corner of the display device 300. It should be appreciated that in an alternative embodiment, the plurality of cameras can be positioned adjacent to a lower right hand corner of the display device 300 and positioned adjacent to a lower left hand corner of the display device 300. It should be appreciated that in other alternative embodiments, the plurality of cameras can be otherwise alternatively positioned in accordance with the present disclosure. It should also be appreciated that in other alternative embodiments, the EGM can include only one such camera or more than two such cameras in accordance with the present disclosure. In various embodiments, the player hand position locator is configured to locate part of the player's hand, such as one or more fingers. In various embodiments, the player hand position locator is configured to simultaneously locate both of the player's hands or locate multiple parts of the player's hands, such as two or more fingers.

In various embodiments, the cameras 330 and 340 are or include time of flight depth camera sensors positioned at the two opposite sides of the display device 300 and focused inwardly somewhat towards each other. This configuration enables the cameras 330 and 340 to track objects, such as one or more of the player's hands in the relatively large right and left player hand tracking zones 314 and 315 (shown in FIG. 5D), respectively. These right and left player hand tracking zones 314 and 315 overlap the player interaction zone 310 (shown in FIG. 5B). In various embodiments, the time of flight depth camera sensors make the EGM less prone to occlusions. In various embodiments, the time of flight depth cameras also deliver point clouds that can be quickly analyzed and used by the processor(s) to make the necessary determinations. It should be appreciated that other suitable depth sensors (other than time of flight sensors) may be employed in accordance with the present disclosure.

In various embodiments, the EGM 100 uses the image data provided by the cameras 330 and 340 to determine the position(s) of the player's hand(s) in the right and left player hand tracking zones 314 and 315 and thus also in the player interaction zone 310. In certain embodiments, the EGM 100 creates the object depth images using point clouds provided by time of flight depth cameras and merges these point clouds to create one optimized point cloud that represents the object(s), such as the player's hand(s) in the right and left player hand tracking zones 314 and 315, and thus any portions thereof also in the player interaction zone 310 and relative to the display device 300. This provides a high degree of accuracy and a relatively large coverage area and player interaction zone (then would a one camera system). In these embodiments, the EGM determines in real time or substantially real time the position(s) of the object(s) such as the player's hand(s) in the player interaction zone 310, and uses the determined position(s) for providing the player haptic or tactile feedback to the player in real time or substantially real time.

Using these two cameras and keeping the camera resolution relatively low: (a) facilitates an increased size of the player interaction zone; and (b) reduces the need for high data rates and significant processing time or delays for image analysis that may slow down the EGM and prevent real time or substantially real time physical player feedback or sensation. Using these two cameras also better facilitates the tracking of multiple player hands.

In various other embodiments, the EGM uses the image data provided by the cameras 330 and 340 to determine the closest depth of the end of the player's hand(s) such as the end of one of the player's fingers that is in the player interaction zone 310 closest to the display device 300. In other words, in these alternative embodiments, the EGM determines the nearest point (i.e., the xyz coordinate relative to the display device 300) of the object such as the player's hand to the display device 300, and then uses that point as the reference for providing the tactile feedback to the player in real time or substantially real time.

In various other embodiments, the EGM uses the image data provided by the cameras 330 and 340 to determine movements or gestures by the player's hand(s). In these embodiments, the EGM uses the determined gestures to provide the player tactile feedback to the player in real time or substantially real time.

In certain embodiments, the EGM includes one or more camera sync cables (not shown) that sync the multiple cameras 330 and 340 to enhance the accuracy of the determination of the position(s) of player's hand(s) in the right and left player hand tracking zones 314 and 315 and in the player interaction zone 310. It should be appreciated that the image data from the multiple cameras can be synced in other suitable manners in accordance with the present disclosure.

It should also be appreciated that other suitable player hand position locating systems or devices can be employed in accordance with the present disclosure.

For example, in various embodiments, the player hand position locator actually estimates the hand pose. The pose of the hand is not the position of the hand, but is instead the location and orientation of certain or every bone of the hand. In certain embodiments, the hand pose is determined by determining or specifying the 3D coordinates of a plurality of or every joint of the skeleton hand.

In this illustrated example embodiment, the player tactile feedback provider of the EGM 100 that is configured to provide tactile feedback to at least one of the player's hands includes a plurality of ultrasonic transducers or two arrays of ultrasonic transducers 360 and 370 supported by the cabinet 200 and positioned directly below and above the first display device 300, respectively. These ultrasonic transducers or ultrasonic transducer arrays 360 and 370 are configured to selectively produce and direct sound waves into lower and upper haptic zones 316 and 317 shown in FIG. 5C and in the player interaction zone 310 from below and above the first display device 300. The EGM 100 uses the ultrasonic transducers or ultrasonic transducer arrays 360 and 370 to produce and send the directed sound waves into the player interaction zone 310 at the determined position(s) of the player's hand(s) to cause the players' hand(s) to feel or sense one or more pulses or the sound waves produced by such devices on a real time or substantially real time basis.

In various embodiments, the EGM 100 uses the ultrasonic transducers or ultrasonic transducer arrays 360 and 370 to produce and send the directed sound waves into the player interaction zone 310 at the determined position(s) of the player's hand(s) when the player's hand(s) are at the same positions of one or more of the displayed virtual objects in the player interaction zone 310 such that the sound waves reaching the player's hand(s) at the positions provide the player the sensation that the player is actually touching, feeling, or interacting with one or more of the displayed virtual objects as if each such object was an actual physical object floating in the player interaction zone 310 in front of the player. This player sensation can occur when the player interacts with virtual object(s) apparently in midair in the player interaction zone 310. Thus, the EGM 100 can simulate a characteristic of one or more of the virtual objects the player appears to be interacting with. This provides one of the many different enhanced physical player interactions that can be provided by the EGM 100 in accordance with the present disclosure.

In various embodiments, the EGM 100 can cause the ultrasonic transducers or ultrasonic transducer arrays 360 and 370 to individually or jointly produce and send continuous, regular, interrupted, directed, or individual sound waves into the areas of the player interaction zone 310 at the determined positions of the player's hand(s) to cause the players' hand(s) to feel such sound waves. In various embodiments, the EGM 100 can cause the ultrasonic transducers or ultrasonic transducer arrays 360 and 370 to vary the intensity of the sound waves into the areas of the player interaction zone 310 at the determined positions of the player's hand(s) to cause the players' hand(s) to feel different sensations.

The EGM 100 can cause the ultrasonic transducers or ultrasonic transducer arrays 360 and 370 to produce and send such different sound waves or sound wave patterns directed to: (a) the positions in the player interaction zone 310 where the player's hand(s) is closest to the display device 300; (b) the positions in the player interaction zone 310 which are where the entire player's hand(s) are at; (c) the positions in the player interaction zone 310 which are where the player's arm(s) is or are at; or (d) any combination of these positions in the player interaction zone 310.

In various embodiments, at the same time or slightly after the EGM creates the physical interaction with the player's hand(s) in the player interaction zone 310, the EGM can cause the display device 300 to alter the image(s) including the virtual object(s) in the player interaction zone 310. This can be used to show one or more responses of the virtual object(s) or other displayed image(s) to the interaction with the player's hand(s).

Thus, in various embodiments, the EGM captures the player's hand(s) or finger(s) midair location coordinates while performing a movement in the player interaction zone 310 in real-time, provides haptic sensation to the player's hand(s) or finger(s) at these coordinates in the player interaction zone 310 with no or little lag time, and can additionally alter the displayed virtual object(s) in real time.

In various embodiments, the EGM maps one or more of the player's hand(s) into the virtual environment displayed by the display device 300 and/or into the player interaction zone 310. In certain such embodiments, the display device 300 can display part of one or more of the player's hand(s) on the display device 300 or as a virtual object to further enhance the player interaction.

In the illustrated example embodiment of the EGM 100 of the present disclosure shown in FIGS. 1 to 10, the cameras 330 and 340 of the player hand position locator of the EGM 100 are positioned directly to the right and left of first display device 300, and the ultrasonic transducers or ultrasonic transducer arrays 360 and 370 are positioned directly below and above the first display device 300. It should be appreciated that in an alternative embodiment of the present disclosure, the cameras 330 and 340 of the player hand position locator of the EGM 100 are positioned directly below and above the first display device 300, and the ultrasonic transducers or ultrasonic transducers arrays 360 and 370 are positioned directly to the right and left of the first display device 300. It should further be appreciated that in an alternative embodiment of the present disclosure, the cameras of the player hand position locator of the EGM are positioned directly below and above the first display device, and the ultrasonic transducers or ultrasonic transducer arrays are also positioned directly below and above the first display device. It should further be appreciated that in an alternative embodiment of the present disclosure, the cameras of the player hand position locator of the EGM are positioned directly to the right and left of the first display device, and the ultrasonic transducers or ultrasonic transducer arrays are positioned directly to the right and left of the first display device. It should further be appreciated that in alternative embodiments of the present disclosure, the ultrasonic transducers or ultrasonic transducer arrays are positioned directly to the right and left of the first display device and directly above and below the first display device or suitable combinations thereof.

In the illustrated example embodiment, the processor(s) and memory device(s) of the EGM 100 co-act or work together to provide the enhanced physical player interaction with the EGM 100 and incorporate the player's hand(s) into one or more of the games provided by the EGM 100 or other functionality provided by the EGM 100. For example, the displayed or projected virtual object(s) can be part of a game that enables or requires the player to interact with the object(s) as part of the play of the game.

It should be appreciated that the player tactile feedback provider can in alternative embodiments provide feedback to the player's hand(s) outside of the player interaction zone in accordance with the present disclosure, but in certain such embodiments, the player would not see virtual objects outside of such player interaction zone.

It should also be appreciated that certain other suitable player tactile feedback providing systems or devices can be employed in accordance with the present disclosure.

It should be appreciated from the above that in various embodiments, the EGM can provide the enhanced physical player interaction in conjunction with game play or other functionality provided by the EGM to the player. For example, the EGM can provide interaction with: (a) one or more fingertips of the player interacting in midair in the player interaction zone that enables the player to make inputs such as drawing letters, symbols, or other images with controlled sensational feedback; or (b) one hand or two hands of the player interacting in midair in the player interaction zone the player to make inputs such as drawing letters, symbols, or other images with controlled sensational feedback.

In various embodiments, the EGM can provide the enhanced physical player interaction in conjunction with other functionality provided by the EGM to the player. For example, the EGM can display virtual images of a series of drinks in the player interaction zone and enable to player to select one of the virtual images. When the player positions the player's hand at the position of the selected drink, the EGM can use the ultrasonic transducers or ultrasonic transducer arrays to provide feedback or sensation to the player's hand indicating that that drink has been selected by the player.

In various embodiments, the EGM includes one or more audible sound producing devices (such as speakers) that produce sounds that are coordinated with the haptic tactile feedback provided to the player by the EGM to further enhance the physical player interaction in conjunction with game player or other functionality provided by the EGM to the player.

In various embodiments, a sound chair is associated with the EGM and includes one or more audible sound producing devices (such as speakers) that produce sounds that are coordinated with the haptic tactile feedback provided to the player by the EGM to further enhance the physical player interaction in conjunction with game player or other functionality provided by the EGM to the player.

Referring now to FIGS. 6A to 10, various examples of how the EGM 100 can function to provide enhance physical player interaction are provided. It should be appreciated that the present disclosure is not limited to these examples, and that the EGM of the present disclosure can provide various different types of enhanced physical player interaction.

Figure 6A:
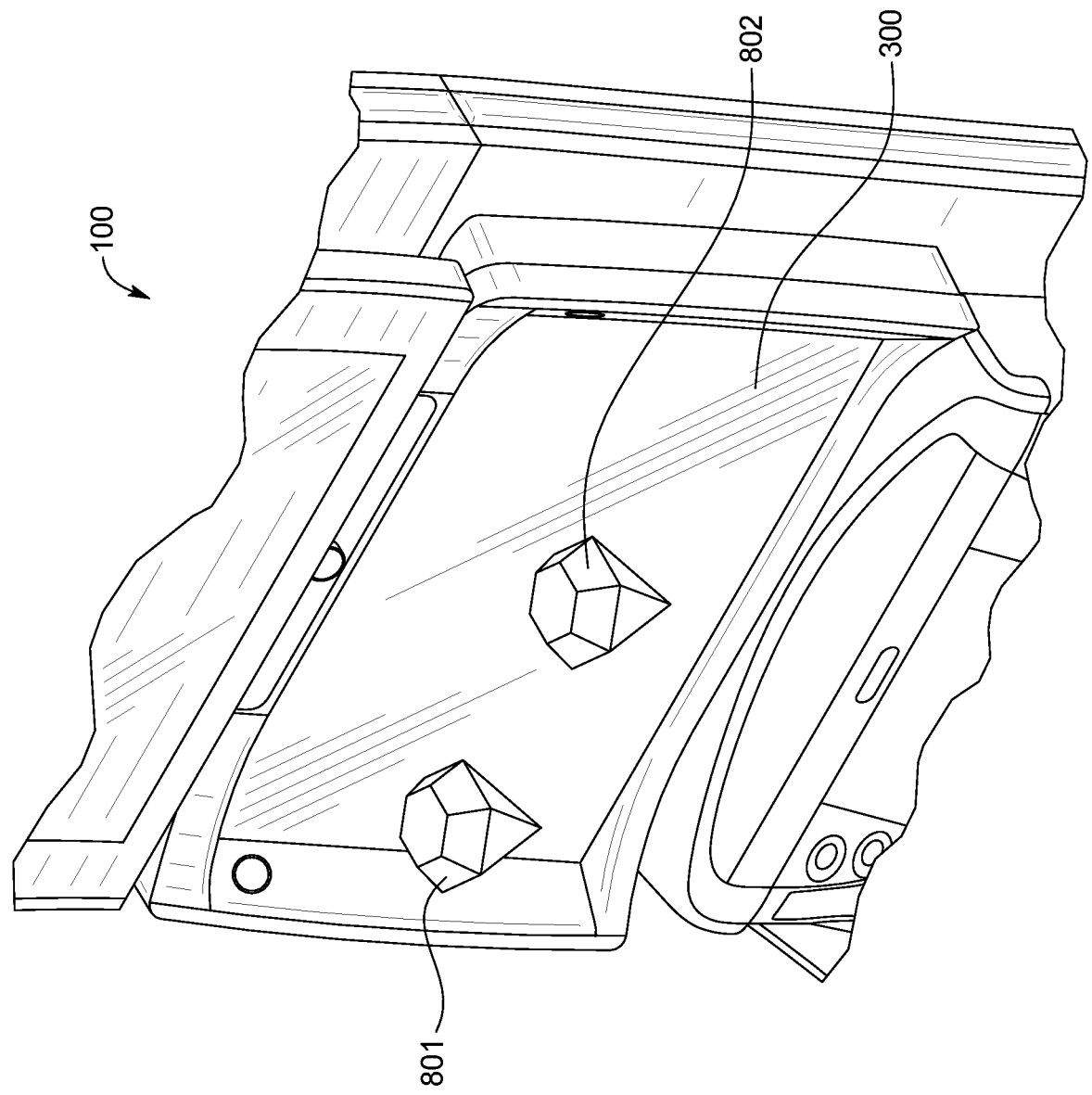
FIG. 6A is an enlarged fragmentary front perspective view of the central portion of the EGM of FIG. 1, showing the EGM displaying in 3D two player selectable virtual objects in the player interaction zone in front of the first display device.
Figure 6B:
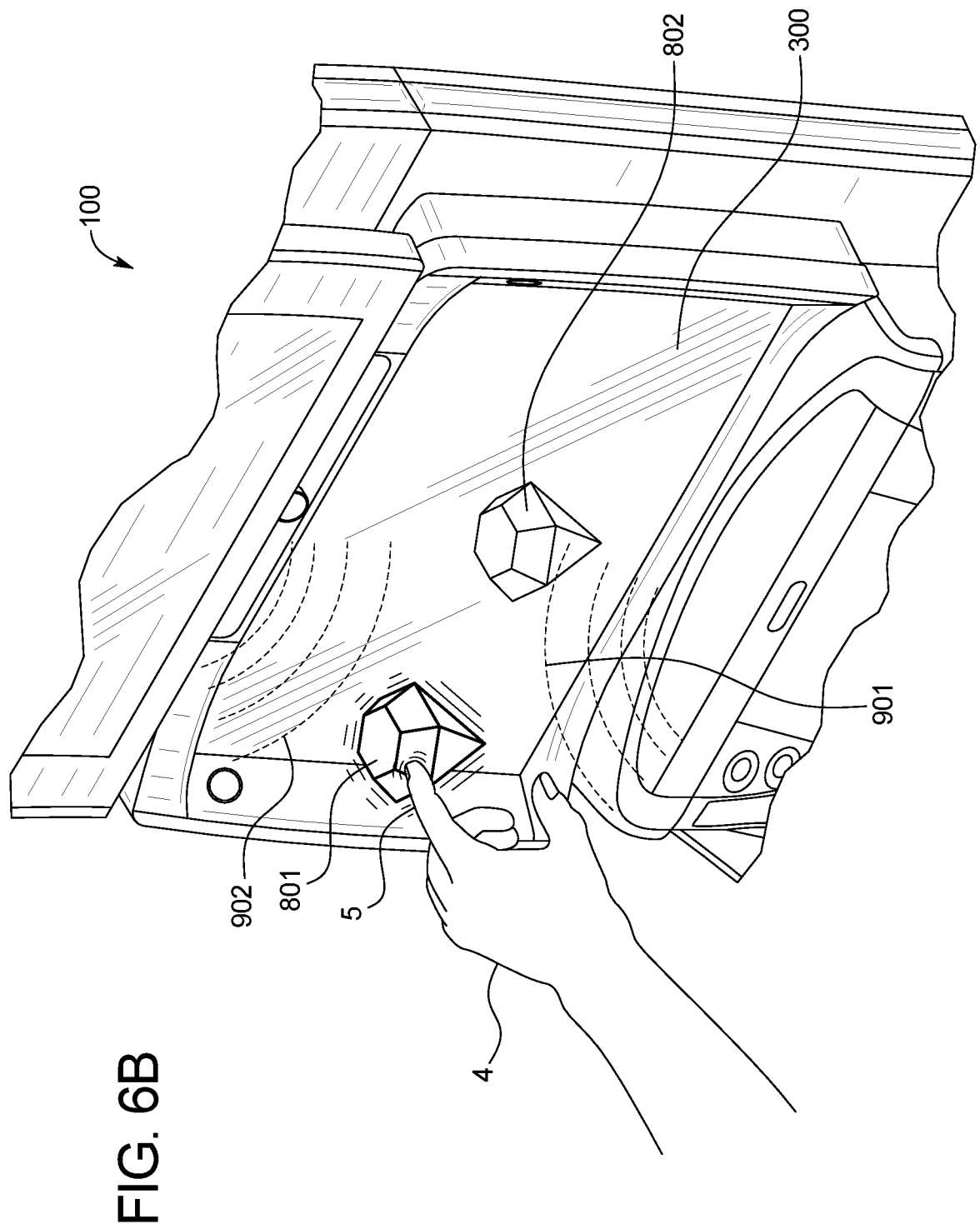
FIG. 6B is an enlarged fragmentary front perspective view of the central portion of the EGM of FIG. 1, showing the EGM displaying in 3D two player selectable virtual objects in the player interaction zone in front of the first display device and a player hand touching one of the two virtual objects, and showing the player hand being subjected to sound waves shown in phantom that cause a sensation in the player's hand.

FIGS. 6A and 6B illustrate one example operation of the EGM 100 of one embodiment of the present disclosure. FIG. 6A shows the EGM 100 displaying in 3D two player selectable virtual objects 801 and 802 in the player interaction zone in front of the display device 300 prior to a player hand touching one of the virtual objects. Of course, it should be appreciated that these objects 801 and 802 are not real, but rather what a player would see looking at the first display device 300. FIG. 6B shows the EGM displaying in 3D the two virtual objects 801 and 802 in front of the display device 100, a player hand 4 and particularly a player finger 5 touching one of the virtual objects 801 that is selected by the player, and the player hand 4 being subject to sound waves 901 and 902 shown in phantom that cause the player to feel one or more sensations of the player touching the object 801. Of course, it should be appreciated that these objects 801 and 802 are not real, but rather what a player would see looking at the first display device 300, and that this shows that at the point in time when it appears to the player that the player is touching the object 801, the player's hand 4 and particularly the player's finger 5 is subjected to the sound waves 901 and 902 that cause one or more sensations in the player hand 4 and particularly the player's finger 5. This example is an example of how the EGM 100 can be used to provide a selection game such as a bonus selection game where the player selects one or more virtual objects to obtain awards. In various embodiments, the touching of the virtual object causes the appearance of the virtual object(s) to move or otherwise change as indicated by the lines indicating the movement of object 801 when "touched" by the player finger 5.

FIG. 7 illustrates another example operation of the EGM 100 of one embodiment of the present disclosure. FIG. 7 shows the EGM 100 displaying in 3D three virtual partial reels 811, 812, and 813 in the player interaction zone in front of the first display device 300 and a player hand 4 and particularly a player finger 5 touching reel 811, and being subjected to sound waves 911 and 912 shown in phantom that cause one or more sensations in the player's hand 4 and particularly the player's finger 5. This example illustrates that various known gaming components (such as but not limited to game symbols, game cards, game reels, game wheels, game tiles, game dice, game chips, game balls, game selections, game characters, game awards, game outcomes, or other game objects) can be shown as virtual objects that can be interacted with by the player in accordance with the present disclosure.

Figure 8:
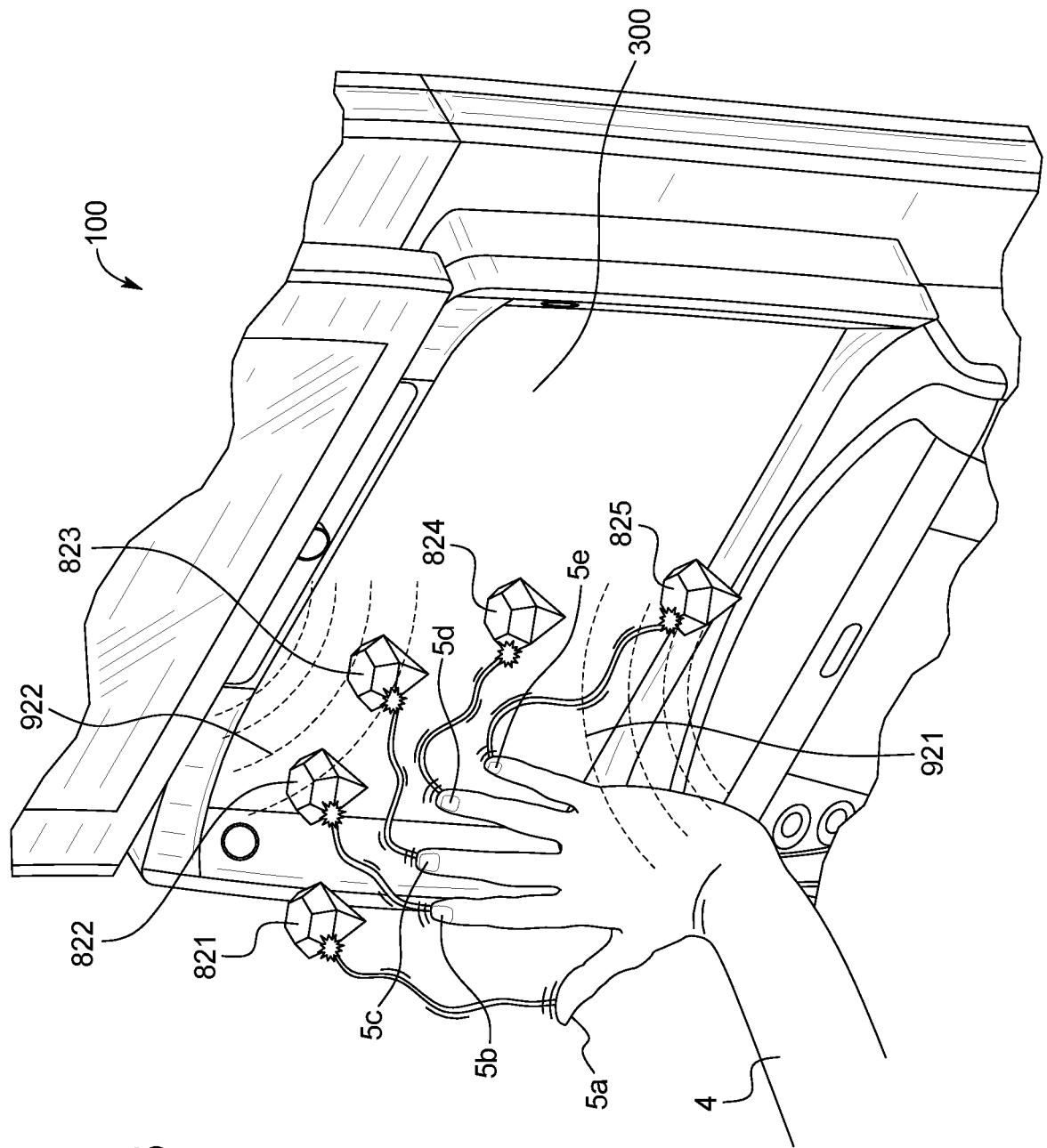
FIG. 8 is an enlarged fragmentary front perspective view of the central portion of the EGM of FIG. 1, showing the EGM displaying in 3D five objects in the player interaction zone in front of the first display device and five lines extending from the player fingers to the five objects, and showing the player hand being subjected to sound waves shown in phantom that cause a sensation in the player's fingers.

FIG. 8 illustrates another example operation of the EGM 100 of one embodiment of the present disclosure. FIG. 8 shows the EGM 100 displaying in 3D five objects 821, 822, 823, 824, and 825 in the player interaction zone in front of the first display device 300 and five lines extending from the player fingers 5A, 5B, 5C, 5D, and 5E of the player's hand 4 to the five objects 821, 822, 823, 824, and 825, and being subjected to sound waves 921 and 922 shown in phantom that cause one or more sensations in the player's fingers 5A, 5B, 5C, 5D, and 5E. FIG. 8 shows the EGM 100 also displaying five lines respectively extending from the player's fingers 5A, 5B, 5C, 5D, and 5E to the five objects 821, 822, 823, 824, and 825 that provides the player a view indicating that the fingers are connected to or somehow affecting the objects. In alternatives of this example embodiment, the objects are displayed by the display device 300 but do not extend into the player interaction zone. This example illustrates another way to provide enhanced physical feedback to the player in accordance with the present disclosure.

FIGS. 9A and 9B illustrate another example operation of the EGM 100 of one embodiment of the present disclosure. FIGS. 9A and 9B shows the EGM 100 displaying in 3D on the player screen (rather than in the player interaction zone) a desired hand position 831. In FIG. 9A, the player's hand 4 is in the player interactive zone but not yet aligned with the displayed player hand 831. FIG. 9A shows that the EGM 100 indicates that the player's hand 4 is in the player interactive zone and is not yet aligned with the displayed player hand 831 by displaying the offset image 832 of a hand which represents the actual position of the player's hand 4 at that point in time as determined by the EGM 100. Thus, in this example embodiment, the EGM 100 has used the player's hand position locator to locate the position of the player's hand 4 in the player interaction zone and display a corresponding image of the player's hand 4 on the display device 300. In FIG. 9B, the player's hand 4 is in the player interactive zone and has now aligned with the displayed player hand 831. At the point of alignment, the EGM 100 subjects the players hand to sound waves 931 and 932 shown in phantom that cause one or more sensations in the player's hand 4. FIG. 9B also shows that the EGM indicates that the player's hand 4 is in the player interactive zone and is aligned with the displayed player hand 831 by displaying the alignment of image 832 of a hand which represents the actual position of the player's hand 4 determined by the EGM 100 at that point in time with the image of the hand 831.

Figure 10:
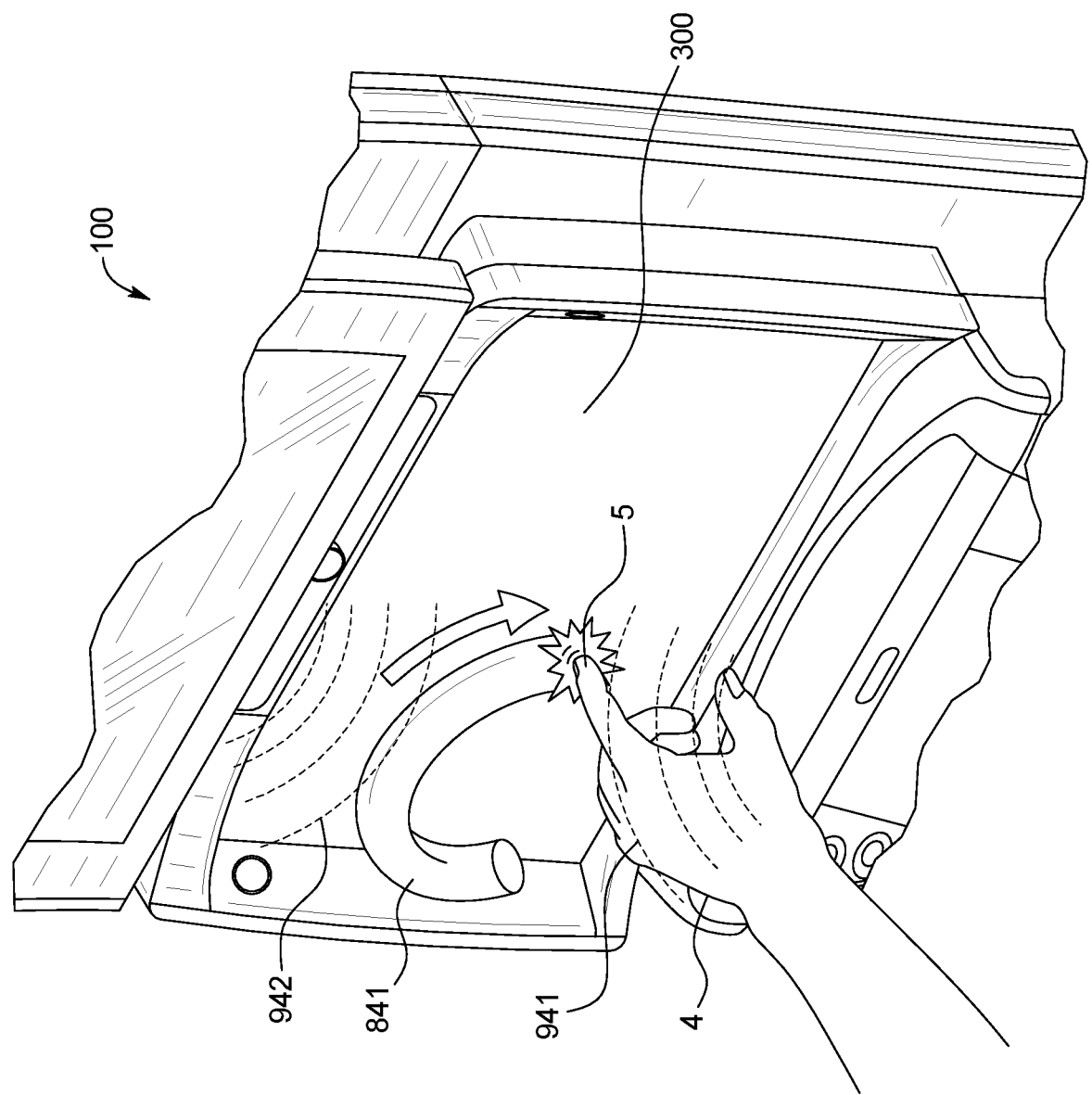
FIG. 10 is an enlarged fragmentary front perspective view of the central portion of the EGM of FIG. 1, showing a player hand in the player interactive zone that is drawing an object, showing the EGM displaying the partially drawn object in the player interactive zone, and showing the player hand being subjected to sound waves shown in phantom that cause a sensation in the player's hand as the player draws the object.

FIG. 10 illustrates another example operation of the EGM 100 of one embodiment of the present disclosure. FIG. 10 shows that the player's hand 4 and particularly the player's finger 5 is drawing an object 841 in the player interaction zone and shows that the EGM 100 is displaying the partially drawn object 841 in the player interactive zone as the player draws the object 841. FIG. 10 shows that the EGM 100 subjects the player's hand 4 or player's finger 5 to sound waves 941 and 942 shown in phantom that cause one or more sensations in the player's hand 4 or player's finger 5 as the player draws the object 841. This example shows that the EGM 100 of the present disclosure can provide continuous player feedback as the player's hand 4 interacts in the player interaction zone.

The above examples illustrate that the EGM 100 can provide enhanced physical player interaction in multiple different manners. It should be appreciated that the present disclosure is not limited to these examples.

Thus, it should be appreciated that in various embodiments, the electronic gaming machine comprises: a housing; a display device supported by the housing; a player eye or head tracker supported by the housing; a player hand position locator supported by the housing; a player tactile feedback provider supported by the housing; at least one input device supported by the housing; at least one processor; and at least one memory device that stores a plurality of instructions.

In various such embodiments of the electronic gaming machine, the plurality of instructions, when executed by the at least one processor, cause the at least one processor to: (a) cause the display device to display a play of a game; (b) cause the display device to display a 3D image to a player without requiring the player to wear 3D glasses; (c) operate with the eye or head tracker to track movement of one of: (i) the head of the player, and (ii) the eyes of the player, and cause the display device to adjust the displayed 3D image based on movement thereof; (d) operate with the hand position locator to determine a position of at least part of one of the player's hands in front of the display device; and (e) operate with the player tactile feedback provider to provide tactile feedback to at least part of one of the player's hands based on the determined position of at least part of one of the player's hands in front of the display device.

In various such embodiments of the electronic gaming machine, the display device includes at least one lenticular lens configured to display the 3D image.

In various such embodiments of the electronic gaming machine, the player eye or head tracker includes at least one camera.

In various such embodiments of the electronic gaming machine, the player eye or head tracker includes at least one camera positioned directly above the display device In various such embodiments of the electronic gaming machine, the player hand position locator includes a plurality of cameras positioned adjacent to the display device.

In various such embodiments of the electronic gaming machine, the player hand position locator includes cameras positioned to the right and left of the display device.

In various such embodiments of the electronic gaming machine, the player tactile feedback provider includes at least one ultrasonic transducer.

In various such embodiments of the electronic gaming machine, the player tactile feedback provider includes an ultrasonic transducer array.

In various such embodiments of the electronic gaming machine, the player tactile feedback provider includes ultrasonic transducers positioned above and below the display device.

In various such embodiments of the electronic gaming machine, the player tactile feedback provider includes ultrasonic transducer arrays positioned above and below the display device.

In various such embodiments of the electronic gaming machine, the plurality of instructions, when executed by the at least one processor, cause the at least one processor to operate with the player tactile feedback provider to provide the tactile feedback to at least part of one of the player's hands when at least part of one of the player's hands is at a position relative to the displayed 3D image.

It should also be appreciated that in various embodiments, the electronic gaming machine comprises: a display device including at least one lenticular lens, and configured to display 3D images; a player eye or head tracker including at least one camera positioned adjacent to the display device; a player hand position locator including at least one camera positioned adjacent to the display device; a player tactile feedback provider including ultrasonic transducers positioned adjacent to the display device; at least one input device; at least one processor; and at least one memory device that stores a plurality of instructions.

In various such embodiments of the electronic gaming machine, the plurality of instructions, when executed by the at least one processor, cause the at least one processor to: (a) cause the display device to display a play of a game; (b) cause the display device to display a 3D image to a player without requiring the player to wear 3D glasses; (c) operate with the player hand position locator to determine a position of one of the player's hands in front of the display device; and (d) operate with the player tactile feedback provider to provide tactile feedback to that player's hand based on the determined position of the part of that player's hand in front of the display device.

In various such embodiments of the electronic gaming machine, the player tactile feedback provider includes an ultrasonic transducer array.

In various such embodiments of the electronic gaming machine, the player tactile feedback provider includes ultrasonic transducer arrays positioned above and below the display device.

In various such embodiments of the electronic gaming machine, the plurality of instructions, when executed by the at least one processor, cause the at least one processor to operate with the player tactile feedback provider to provide tactile feedback to that player's hand when that player's hand is at a position relative to the displayed 3D image.

In various such embodiments of the electronic gaming machine, the plurality of instructions, when executed by the at least one processor, cause the at least one processor to operate with the player eye or head tracker to track movement of one of (i) the head of the player, and (ii) the eyes of the player, and cause the display device to adjust the displayed 3D image based on movement thereof.

In various such embodiments of the electronic gaming machine, the player hand position locator includes two cameras positioned to the right and left of the display device.

II. EGM—General Components and Operation

The EGM of the present disclosure can be controlled locally by one or more processors, and/or remotely or partially remotely by one or more remote processors, central servers, central controllers, or remote host. In various embodiments, the EGM of the present disclosure can be part of a gaming system (which is also part of the present disclosure) that includes one or more EGMs in combination with one or more remote processors, central servers, central controllers, or remote hosts. In such embodiments, the EGM is configured to communicate with the remote processors, central servers, central controllers, or remote hosts through a data network or remote communication link. In certain such embodiments, the EGM is configured to communicate with one or more other EGMs through the same data network or remote communication link or through a different data network or remote communication link.

In certain embodiments in which the gaming system includes an EGM in combination with a remote processor, central server, central controller, or remote host, the remote processor, central server, central controller, or remote host is any suitable computing device that includes at least one processor and at least one memory device or data storage device. As further described herein, the EGM includes at least one EGM processor configured to transmit and receive data or signals representing events, messages, commands, or any other suitable information between the EGM and the remote processor, central server, central controller, or remote host. The at least one processor of that EGM is configured to execute the events, messages, or commands represented by such data or signals in conjunction with the operation of the EGM. Moreover, the at least one processor of the remote processor, central server, central controller, or remote host is configured to transmit and receive data or signals representing events, messages, commands, or any other suitable information between the remote processor, central server, central controller, or remote host and the EGM. One, more than one, or each of the functions of the at least one processor of the EGM may be performed by the remote processor, the central server, the central controller, or the remote host.

In certain such embodiments, computerized instructions for controlling any games (such as any primary or base games and/or any secondary or bonus games) displayed by the EGM are executed by the remote processor, central server, central controller, or remote host. In such "thin client" embodiments, the remote processor, central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the remote processor, central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a remote processor, central server, central controller, or remote host, computerized instructions for controlling any primary or base games displayed by the EGM are communicated from the remote processor, central server, central controller, or remote host to the EGM in a thick client configuration, and computerized instructions for controlling any secondary or bonus games or other functions displayed by the EGM are executed by the remote processor, central server, central controller, or remote host in a thin client configuration.

In certain embodiments in which the gaming system includes: (a) an EGM configured to communicate with a remote processor, central server, central controller, or remote host through a data network; and/or (b) a plurality of EGMs configured to communicate with one another through a data network, the data network is a local area network (LAN) in which the EGMs are located substantially proximate to one another and/or the remote processor, central server, central controller, or remote host. In one example, the EGMs and the remote processor, central server, central controller, or remote host are located in a gaming establishment or a portion of a gaming establishment.

In other embodiments in which the gaming system includes: (a) an EGM configured to communicate with a remote processor, central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the remote processor, central server, central controller, or remote host. For example, one or more of the EGMs are located: (a) in an area of a gaming establishment different from an area of the gaming establishment in which the remote processor, central server, central controller, or remote host is located; or (b) in a gaming establishment different from the gaming establishment in which the remote processor, central server, central controller, or remote host is located. In another example, the remote processor, central server, central controller, or remote host is not located within a gaming establishment in which the EGMs are located. In certain embodiments in which the data network is a WAN, the gaming system includes a remote processor, central server, central controller, or remote host and an EGM each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a remote processor, central server, central controller, or remote host through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the remote processor, central server, central controller, or remote host identifies a player prior to enabling that player to place any wagers on any plays of any wagering games. In one example, the remote processor, central server, central controller, or remote host identifies the player by requiring a player account of the player to be logged into via an input of a unique username and password combination assigned to the player. The remote processor, central server, central controller, or remote host may, however, identify the player in any other suitable manner, such as: by validating a player tracking identification number associated with the player; by reading a player tracking card or other smart card inserted into a card reader (as described below); by validating a unique player identification number associated with the player by the remote processor, central server, central controller, or remote host; or by identifying the EGM, such as by identifying the MAC address or the IP address of the Internet facilitator. In various embodiments, once the remote processor, central server, central controller, or remote host identifies the player, the remote processor, central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. Nos. 8,764,566, entitled "Internet Remote Game Server," and 8,147,334, entitled "Universal Game Server," which are incorporated herein by reference.

The remote processor, central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 11:
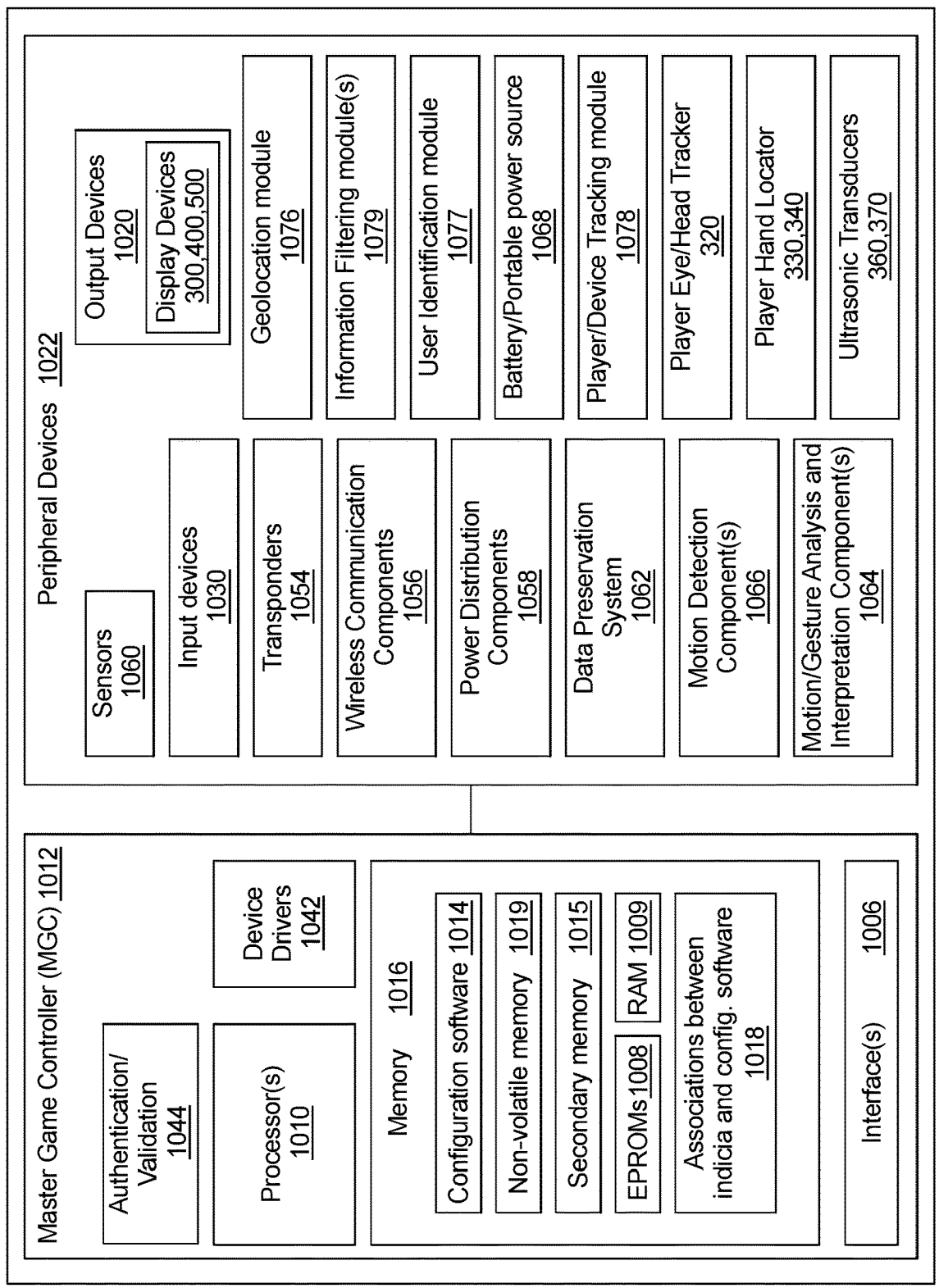
FIG. 11 is a schematic block diagram of one example embodiment of the electronic configuration of the EGM of the present disclosure.

Referring now to FIG. 11, in various embodiments, the EGM 1000 includes a master gaming controller 1012 configured to communicate with and to operate with a plurality of peripheral devices 1022 (in addition to and including the above described devices 300, 320, 330, 340, 360, and 370).

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620, 047, entitled "Electronic Gaming Apparatus Having Authentication Data Sets," which is incorporated herein by reference.

In certain embodiments, in addition to the input, output and other components described in the first section above, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 100 illustrated in FIG. 1 includes a first display device 300, a player tracking display, a credit display, and a bet display.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGM 100 and illustrated in FIG. 1 may include a ticket printer and dispenser. Examples of ticket-in ticket-out (TITO) technology are described in U.S. Pat. Nos. 5,429,361, entitled "Gaming Machine Information, Communication and Display System"; 5,470,079, entitled "Gaming Machine Accounting and Monitoring System"; 5,265,874, entitled "Cashless Gaming Apparatus and Method"; 6,729,957, entitled "Gaming Method and Host Computer with Ticket-In/Ticket-Out Capability"; 6,729,958, entitled "Gaming System with Ticket-In/Ticket-Out Capability"; 6,736,725, entitled "Gaming Method and Host Computer with Ticket-In/Ticket-Out Capability"; 7,275,991, entitled "Slot Machine with Ticket-In/Ticket-Out Capability"; 6,048,269, entitled "Coinless Slot Machine System and Method"; and 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 includes one or more sound generating devices controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGM 100 illustrated in FIG. 1 includes a plurality of speakers. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGM 100 illustrated in FIG. 1 may include a combined bill and ticket acceptor and a coin slot.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGM 100 illustrated in FIG. 1 may include a game play activation device in the form of a game play initiation button. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGM 100 illustrated in FIG. 1 may include a cashout device in the form of a cashout button.

In various embodiments, the at least one input device includes a plurality of buttons that are programmable by the EGM operator to, when actuated, cause the EGM to perform particular functions. For instance, such buttons may be hard keys, programmable soft keys, or icons displayed on a display device of the EGM (described below) that are actuatable via a touch screen of the EGM (described below) or via use of a suitable input device of the EGM (such as a mouse or a joystick). The example EGM 100 illustrated in FIG. 1 may include a plurality of such buttons.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGM 100 illustrated in FIG. 1 may include a card reader. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, in addition to the components described in the first section above, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM (in addition to the detections described above); detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

In addition to the eye or head tracker described above, the EGM of the present disclosure can also include at least one motion/gesture analysis and interpretation component 1064 configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM 1000 to operate in a mobile environment. For example, in one embodiment, the EGM 100 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

In certain embodiments, the EGM is a device that has obtained approval from a regulatory gaming commission, and in other embodiments, the EGM is a device that has not obtained approval from a regulatory gaming commission.

The EGMs described above are merely examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (sometimes referred to herein as "primary games") and/or any secondary or bonus games or other functions (sometimes referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a remote processor, central server, central controller, or remote host and a changeable EGM, the at least one memory device of the remote processor, central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the remote processor, central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the EGM randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the EGM generates the game outcome(s) and/or the award(s) to be provided based on the associated probabilities. In these embodiments, since the EGM generates game outcomes and/or awards randomly or based on one or more probability calculations, there is no certainty that the EGM will ever provide any specific game outcome and/or award.

In certain embodiments, the EGM maintains one or more predetermined pools or sets of predetermined game outcomes and/or awards. In certain such embodiments, upon generation or receipt of a game outcome and/or award request, the EGM independently selects one of the predetermined game outcomes and/or awards from the one or more pools or sets. The EGM flags or marks the selected game outcome and/or award as used. Once a game outcome or an award is flagged as used, it is prevented from further selection from its respective pool or set; that is, the EGM does not select that game outcome or award upon another game outcome and/or award request. The EGM provides the selected game outcome and/or award. Examples of this type of award evaluation are described in U.S. Pat. Nos. 7,470,183, entitled "Finite Pool Gaming Method and Apparatus"; 7,563,163, entitled "Gaming Device Including Outcome Pools for Providing Game Outcomes"; 7,833,092, entitled "Method and System for Compensating for Player Choice in a Game of Chance"; 8,070,579, entitled "Bingo System with Downloadable Common Patterns"; and 8,398,472, entitled "Central Determination Poker Game," which are incorporated herein by reference.

In certain embodiments, the EGM determines a predetermined game outcome and/or award based on the results of a bingo, keno, or lottery game. In certain such embodiments, the EGM utilizes one or more bingo, keno, or lottery games to determine the predetermined game outcome and/or award provided for a primary game and/or a secondary game. The EGM is provided or associated with a bingo card. Each bingo card consists of a matrix or array of elements, wherein each element is designated with separate indicia. After a bingo card is provided, the EGM randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. Nos. 7,753,774, entitled "Using Multiple Bingo Cards to Represent Multiple Slot Paylines and Other Class III Game Options"; 7,731,581, entitled "Multi-Player Bingo Game with Multiple Alternative Outcome Displays"; 7,955,170, entitled "Providing Non-Bingo Outcomes for a Bingo Game"; 8,070,579, entitled "Bingo System with Downloadable Common Patterns"; and 8,500,538, entitled "Bingo Gaming System and Method for Providing Multiple Outcomes from Single Bingo Pattern," which are incorporated herein by reference.

In certain embodiments in which the EGM is configured to communicate with the remote processor, central server, central controller, or remote host for monitoring purposes only. In such embodiments, the EGM determines the game outcome(s) and/or award(s) to be provided in any of the manners described above, and the remote processor, central server, central controller, or remote host monitors the activities and events occurring on the EGM. In one such embodiment, the EGM includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. Nos. 6,913,534, entitled "Gaming Machine Having a Lottery Game and Capability for Integration with Gaming Device Accounting System and Player Tracking System," and 8,597,116, entitled "Virtual Player Tracking and Related Services," which are incorporated herein by reference.

As noted above, in various embodiments, the EGM includes one or more executable game programs executable by at least one processor of the EGM to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the EGM includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the EGM. In certain such embodiments, the EGM includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The EGM enables a wager to be placed on one or more of such paylines to activate such paylines. In other embodiments in which one or more paylines are formed between at least two adjacent symbol display areas, the EGM enables a wager to be placed on a plurality of symbol display areas, which activates those symbol display areas.

In various embodiments, the EGM provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the EGM employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. Nos. 8,012,011, entitled "Gaming Device and Method Having Independent Reels and Multiple Ways of Winning"; 8,241,104, entitled "Gaming Device and Method Having Designated Rules for Determining Ways To Win"; and 8,430,739, entitled "Gaming System and Method Having Wager Dependent Different Symbol Evaluations," which are incorporated herein by reference.

In various embodiments, the EGM includes a progressive award. Typically, a progressive award includes an initial amount and an additional amount funded through a portion of each wager placed to initiate a play of a primary game. When one or more triggering events occurs, the EGM provides at least a portion of the progressive award. After the EGM provides the progressive award, an amount of the progressive award is reset to the initial amount and a portion of each subsequent wager is allocated to the next progressive award. Examples of progressive gaming systems or EGMs are described in U.S. Pat. Nos. 7,585,223, entitled "Server Based Gaming System Having Multiple Progressive Awards"; 7,651,392, entitled "Gaming Device System Having Partial Progressive Payout"; 7,666,093, entitled "Gaming Method and Device Involving Progressive Wagers"; 7,780,523, entitled "Server Based Gaming System Having Multiple Progressive Awards"; and 8,337,298, entitled "Gaming Device Having Multiple Different Types of Progressive Awards," which are incorporated herein by reference As generally noted above, in addition to providing winning credits or other awards for one or more plays of the primary game(s), in various embodiments the EGM provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the EGM automatically provides or initiates the secondary game upon the occurrence of a triggering event or the satisfaction of a qualifying condition. In other embodiments, the EGM initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the EGM randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the EGM determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. Nos. 8,070,583, entitled "Server Based Gaming System and Method for Selectively Providing One or More Different Tournaments"; 8,500,548, entitled "Gaming System and Method for Providing Team Progressive Awards"; and 8,562,423, entitled "Method and Apparatus for Rewarding Multiple Game Players for a Single Win," which are incorporated herein by reference.

In various embodiments, the gaming system or EGM includes one or more player tracking systems. Such player tracking systems enable operators of the gaming system or EGM (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the EGM to begin a gaming session, the card reader reads the player identification number off the player tracking card to identify the player. The EGM timely tracks any suitable information or data relating to the identified player's gaming session. The EGM also timely tracks when the player tracking card is removed to conclude play for that gaming session. In another embodiment, rather than requiring insertion of a player tracking card into the card reader, the EGM utilizes one or more portable devices, such as a mobile phone, a radio frequency identification tag, or any other suitable wireless device, to track when a gaming session begins and ends. In another embodiment, the EGM utilizes any suitable biometric technology or ticket technology to track when a gaming session begins and ends.

In such embodiments, during one or more gaming sessions, the EGM tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the first display device and/or the upper display device. Examples of player tracking systems are described in U.S. Pat. Nos. 6,722,985, entitled "Universal Player Tracking System"; 6,908,387, entitled "Player Tracking Communication Mechanisms in a Gaming Machine"; 7,311,605, entitled "Player Tracking Assembly for Complete Patron Tracking for Both Gaming and Non-Gaming Casino Activity"; 7,611,411, entitled "Player Tracking Instruments Having Multiple Communication Modes"; 7,617,151, entitled "Alternative Player Tracking Techniques"; and 8,057,298, entitled "Virtual Player Tracking and Related Services," which are incorporated herein by reference.

Certain of the gaming systems described herein, including EGMs located in a casino or another gaming establishment, include certain components and/or are configured to operate in certain manners that differentiate these EGMs and systems from general purpose computing devices (i.e., certain personal gaming devices such as desktop computers and laptop computers).

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are typically not state-based machines, and a majority of data can be lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. Nos. 6,962,530, entitled "Authentication in a Secure Computerized Gaming System"; 7,043,641, entitled "Encryption in a Secure Computerized Gaming System"; 7,201,662, entitled "Method and Apparatus for Software Authentication"; and 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. Nos. 6,804,763, entitled "High Performance Battery Backed RAM Interface"; 6,863,608, entitled "Frame Capture of Actual Game Play"; 7,111,141, entitled "Dynamic NV-RAM"; and 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

It should further be appreciated that the EGM of the present disclosure may have varying or alternative housing configurations.

It should further be appreciated that the EGM of the present disclosure may have varying or alternative display device configurations.

In various embodiments, the EGM of the present disclosure is configured to be positioned on a base or stand.

It should be appreciated that the enhanced physical player interaction provided by the present disclosure, in addition to being implemented in an EGM configured to be located on a casino floor, can be implemented in one or more personal gaming devices, such as desktop computers, laptop computers, tablet computers or computing devices, personal digital assistants, mobile phones, and other mobile computing devices.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic gaming machine comprising:
   a housing;
   a display device supported by the housing;
   a player eye or head tracker supported by the housing;
   a player hand position locator supported by the housing;
   a player tactile feedback provider supported by the housing;

at least one input device supported by the housing;

at least one processor; and at least one memory device comprising a plurality of instructions that, when executed, cause the at least one processor to:

cause the display device to display a play of a game;

cause the display device to display a player selectable 3D image to a player without requiring the player to wear 3D glasses;

operate with the player eye or head tracker to track movement of one of the head of the player and the eyes of the player, and cause the display device to adjust the displayed player selectable 3D image based on movement thereof;

operate with the player hand position locator to determine a position of a finger of one of the player's hands in front of the display device, and cause the display device to display a line extending from the determined position of that finger of the player's hand to the displayed player selectable 3D image to indicate an interaction between the finger of the player's hand and the displayed player selectable 3D image; and operate with the player tactile feedback provider to provide tactile feedback to that finger of the player's hand based on the determined position of that finger of the player's hand in front of the display device and the interaction between the finger of the player's hand and the displayed player selectable 3D image.

2. The electronic gaming machine of claim 1, wherein the display device includes at least one lenticular lens configured to display the player selectable 3D image.

3. The electronic gaming machine of claim 1, wherein the player eye or head tracker includes at least one camera.

4. The electronic gaming machine of claim 1, wherein the player eye or head tracker includes at least one camera positioned directly above the display device.

5. The electronic gaming machine of claim 1, wherein the player hand position locator includes a plurality of cameras positioned adjacent to the display device.

6. The electronic gaming machine of claim 1, wherein the player hand position locator includes cameras positioned to the right and left of the display device.

7. The electronic gaming machine of claim 1, wherein the player tactile feedback provider includes at least one ultrasonic transducer.

8. The electronic gaming machine of claim 1, wherein the player tactile feedback provider includes an ultrasonic transducer array.

9. The electronic gaming machine of claim 1, wherein the player tactile feedback provider includes ultrasonic transducers positioned above or below the display device.

10. The electronic gaming machine of claim 1, wherein the player tactile feedback provider includes ultrasonic transducer arrays positioned above or below the display device.

11. The electronic gaming machine of claim 1, wherein the plurality of instructions, when executed by the at least one processor, cause the at least one processor to operate with the player tactile feedback provider to provide the tactile feedback to that finger of the player's hand when that player's hand is at a position relative to the displayed player selectable 3D image.

12. An electronic gaming machine comprising:

a display device including at least one lenticular lens, and configured to display 3D images;

a player hand position locator including at least one camera positioned adjacent to the display device;

a player tactile feedback provider including ultrasonic transducers positioned adjacent to the display device;

at least one input device;

at least one processor; and at least one memory device comprising a plurality of instructions that, when executed, cause the at least one processor to:

cause the display device to display a play of a game;

cause the display device to display a player selectable 3D image to a player without requiring the player to wear 3D glasses;

operate with the player hand position locator to determine a position of a finger of one of the player's hands in front of the display device, and cause the display device to display a line extending from the determined position of that finger of the player's hand to the displayed player selectable 3D image to indicate an interaction between the finger of the player's hand and the displayed player selectable 3D image; and operate with the player tactile feedback provider to provide tactile feedback to that finger of the player's hand based on the determined position of that finger of player's hand in front of the display device and the interaction between the finger of the player's hand and the displayed player selectable 3D image.

13. The electronic gaming machine of claim 12, wherein the player tactile feedback provider includes an ultrasonic transducer array.

14. The electronic gaming machine of claim 12, wherein the player tactile feedback provider includes ultrasonic transducer arrays positioned above or below the display device.

15. The electronic gaming machine of claim 12, wherein the plurality of instructions, when executed by the at least one processor, cause the at least one processor to operate with the player tactile feedback provider to provide tactile feedback to that finger of the player's hand when that player's hand is at a position relative to the displayed player selectable 3D image.

16. The electronic gaming machine of claim 12, further comprising a player eye or head tracker comprising at least one camera positioned adjacent to the display device, wherein the plurality of instructions, when executed by the at least one processor, cause the at least one processor to operate with the player eye or head tracker to track movement of one of the head of the player, and the eyes of the player, and cause the display device to adjust the displayed player selectable 3D image based on movement thereof.

17. The electronic gaming machine of claim 12, wherein the player hand position locator includes two cameras positioned to the right and left of the display device.

* * * * *